(12) United States Patent
Zhou et al.

(10) Patent No.: US 12,273,652 B2
(45) Date of Patent: Apr. 8, 2025

(54) TRANSMISSION METHOD, APPARATUS, AND SYSTEM

(71) Applicant: Huawei Technologies Co., Ltd., Shenzhen (CN)

(72) Inventors: Weiguang Zhou, Shenzhen (CN); Hua Long, Shenzhen (CN); Zhenxing Zhang, Shenzhen (CN); Jiandong Ke, Shanghai (CN); Zhaohua Qian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/356,854

(22) Filed: Jul. 21, 2023

(65) Prior Publication Data

US 2023/0362330 A1    Nov. 9, 2023

Related U.S. Application Data

(63) Continuation of application No. PCT/CN2021/073052, filed on Jan. 21, 2021.

(51) Int. Cl.
*H04N 7/10* (2006.01)
*H04N 7/14* (2006.01)

(52) U.S. Cl.
CPC ............... *H04N 7/10* (2013.01); *H04N 7/14* (2013.01)

(58) Field of Classification Search
CPC .................................. H04N 7/10; H04N 7/14
See application file for complete search history.

(56) References Cited

U.S. PATENT DOCUMENTS

| | | | |
|---|---|---|---|
| 6,868,096 B1* | 3/2005 | Hayashi | H04N 21/2368 370/535 |
| 7,944,916 B2 | 5/2011 | Cha et al. | |
| 8,059,673 B2 | 11/2011 | Kobayashi | |
| 10,025,748 B2 | 7/2018 | Chen et al. | |
| 2010/0254408 A1* | 10/2010 | Kuno | H04N 21/4334 370/474 |

FOREIGN PATENT DOCUMENTS

| | | |
|---|---|---|
| CN | 104954725 A | 9/2015 |
| WO | 0014966 A1 | 3/2000 |

* cited by examiner

*Primary Examiner* — Clayton R Williams
(74) *Attorney, Agent, or Firm* — Conley Rose, P.C.

(57) ABSTRACT

A transmission method, apparatus, and system implement bidirectional transmission of an audio/video signal between peer devices. The transmission system may include a first transmission apparatus and a second transmission apparatus, where the first transmission apparatus is connected to the second transmission apparatus through a first cable, and the first cable includes a first number of main downlink lanes and a second number of main uplink lanes. Bidirectional transmission of the audio/video signal between the first transmission apparatus and the second transmission apparatus is performed through the first cable.

20 Claims, 15 Drawing Sheets

TRANSMISSION METHOD, APPARATUS, AND SYSTEM

CROSS-REFERENCE TO RELATED APPLICATIONS

This application is a continuation of International Patent Application No. PCT/CN2021/073052 filed on Jan. 21, 2021, the disclosure of which is hereby incorporated by reference in its entirety.

TECHNICAL FIELD

The present application relates to the field of multimedia technologies, and more specifically, to a transmission method, apparatus, and system in the field of multimedia technologies.

BACKGROUND

A conventional multimedia electronic device (such as a television) usually includes a display system and a host system. However, as the multimedia electronic devices are developed to be lighter and thinner, split-type multimedia electronic devices emerge.

A display system of a split-type television is separated from a host system. This breaks a structure mode of integrating a display system and a host system of a conventional television, resolves many problems of the conventional television that cannot be resolved for a long period of time, greatly prolongs a service life of the television, and greatly improves sound effect and function usability of the television. Usually, the host system (that is, a source device) in the split-type television generates an audio/video signal (which includes a video signal and/or an audio signal), and transmits the audio/video signal to the display system (that is, a sink device) through a high-definition multimedia interface (HDMI), and then the display system plays the audio/video signal.

As a smart interaction center, a cross-screen experience center, an internet of things (IoT) control center, and a multimedia entertainment center of a home, the smart split-type television not only needs to support the host system to transmit a downlink audio/video signal to the display system for playing, but also needs to support a camera in the display system to reversely transmit the collected audio/video signal to the host system.

Therefore, it is urgent to provide a technical solution in which bidirectional transmission of the audio/video signal between peer devices can be implemented.

SUMMARY

The present disclosure provides a transmission method, apparatus, and system, to implement bidirectional transmission of an audio/video signal between peer devices.

According to a first aspect, an embodiment of the present disclosure provides a transmission system. The system may include a first transmission apparatus and a second transmission apparatus. The first transmission apparatus includes a first audio/video source adapter, a first audio/video sink adapter, a first multiplexer, a first demultiplexer, a first lane allocator, a first lane deallocator, and a first port. The second transmission apparatus includes a second audio/video source adapter, a second audio/video sink adapter, a second multiplexer, a second demultiplexer, a second lane allocator, a second lane deallocator, and a second port. The first port is connected to the second port through a first cable. The first cable includes a first number of main downlink lanes and a second number of main uplink lanes.

The first audio/video source adapter is configured to: obtain a downlink media signal, where the downlink media signal includes a downlink video signal and/or a downlink audio signal; encapsulate the downlink media signal to obtain a first downlink packet; and send the first downlink packet to the first multiplexer.

The first multiplexer is configured to: pad the first downlink packet into a downlink data stream, and send a padded downlink data stream to the first lane allocator.

The first lane allocator is configured to: allocate the downlink data stream to a first main downlink lane, and send the downlink data stream to the second transmission apparatus. The first main downlink lane includes at least one main downlink lane in the first number of main downlink lanes.

The second lane deallocator is configured to: combine the downlink sub-data streams received through the first main downlink lane into the downlink data stream, and send the downlink data stream to the second demultiplexer.

The second demultiplexer is configured to: extract the first downlink packet from the downlink data stream, and send the first downlink packet to the second audio/video sink adapter.

The second audio/video sink adapter is configured to decapsulate the first downlink packet to obtain the downlink media signal.

The second audio/video source adapter is configured to: obtain an uplink media signal, where the uplink media signal includes an uplink video signal and/or an uplink audio signal; encapsulate the uplink media signal to obtain a first uplink packet; and send the first uplink packet to the second multiplexer.

The second multiplexer is configured to: pad the first uplink packet into an uplink data stream, and send a padded uplink data stream to the second lane allocator.

The second lane allocator is configured to: allocate the uplink data stream to a first main uplink lane, and send the uplink data stream to the first transmission apparatus. The first main uplink lane includes at least one main uplink lane in the second number of main uplink lanes.

The first lane deallocator is configured to: combine uplink sub-data streams received through the first main uplink lane into the uplink data stream, and send the uplink data stream to the first demultiplexer.

The first demultiplexer is configured to: extract the first uplink packet from the uplink data stream, and send the first uplink packet to the first audio/video sink adapter.

The first audio/video sink adapter is configured to decapsulate the first uplink packet to obtain the uplink media signal.

It should be noted that the first transmission apparatus may be (or integrated into) a source device, and the second transmission apparatus may be (integrated into) a sink device.

It should be further noted that a media signal in embodiments of the present disclosure may also be referred to as an audio/video signal.

For example, the downlink media signal may also be referred to as a downlink audio/video signal, and the uplink media signal may also be referred to as an uplink audio/video signal.

According to the transmission system provided in this embodiment of the present disclosure, bidirectional transmission of the media signal can be implemented between peer devices through a cable.

In a possible implementation, the encapsulation and the decapsulation in this embodiment of the present disclosure are performed based on a unified transport protocol (for example, a first transport protocol).

According to the transmission system provided in this embodiment of the present disclosure, because the first downlink packet sent by the source device is obtained by performing one-layer encapsulation on the downlink media signal based on the first transport protocol, after receiving the first downlink packet, the sink device may perform one-layer decapsulation based on the first transport protocol to obtain the downlink media signal. Similarly, because the first uplink packet sent by the sink device is obtained by performing one-layer encapsulation on the uplink media signal based on the first transport protocol, after receiving the first uplink packet, the source device may perform one-layer decapsulation based on the first transport protocol to obtain the uplink media signal.

In addition, the media signal in this embodiment of the present disclosure is a generated or collected original media signal, including a clock signal, a vertical synchronization signal, a horizontal synchronization signal, display enabling, video data, audio data, and the like. In an actual application scenario, bidirectional transmission of a data stream is performed between the source device and the sink device in a wired manner (that is, through a cable), only one-layer encapsulation/decapsulation may be performed on the media signal, and video encoding/decoding (for example, H.264, H.265, and AVS2/3) is not required. Therefore, this can reduce complexity of a signal source of the media signal and the sink device, reduce an image quality loss caused by video encoding/decoding, and reduce a delay caused by video encoding/decoding, to improve transmission efficiency and user experience.

In a possible implementation, the first number is greater than or equal to the second number.

Further, the first number may be greater than the second number.

According to the transmission system provided in this embodiment of the present disclosure, asymmetric bidirectional transmission (in other words, the first number is not equal to the second number) can be implemented between the source device and the sink device, for example, the first number may be greater than the second number, to meet a requirement of asymmetric bidirectional transmission in which a downlink transmission rate is greater than an uplink transmission rate in an actual application.

In a possible implementation, the apparatus further includes a first third-party protocol adapter and a second third-party protocol adapter.

The first third-party protocol adapter is configured to: obtain a downlink third-party protocol signal, encapsulate the downlink third-party protocol signal to obtain a second downlink packet, and send the second downlink packet to the first multiplexer.

The first multiplexer is specifically configured to multiplex the first downlink packet and the second downlink packet into the downlink data stream.

The second demultiplexer is specifically configured to demultiplex the first downlink packet and the second downlink packet from the downlink data stream.

The second demultiplexer is further configured to send the second downlink packet to the second third-party protocol adapter.

The second third-party protocol adapter is configured to decapsulate the second downlink packet to obtain the downlink third-party protocol signal.

The second third-party protocol adapter is further configured to: obtain an uplink third-party protocol signal, encapsulate the uplink third-party protocol signal to obtain a second uplink packet, and send the second uplink packet to the second multiplexer.

The second multiplexer is specifically configured to multiplex the first uplink packet and the second uplink packet into the uplink data stream.

The first demultiplexer is specifically configured to demultiplex the first uplink packet and the second uplink packet from the uplink data stream.

The first demultiplexer is further configured to send the second uplink packet to the first third-party protocol adapter.

The first third-party protocol adapter is further configured to decapsulate the second uplink packet to obtain the uplink third-party protocol signal.

According to the transmission system provided in this embodiment of the present disclosure, bidirectional transmission of a third-party protocol signal can be further implemented between the peer devices through the cable. That is, bidirectional transmission of the media signal and the third-party protocol signal can be implemented between the peer devices through the cable.

In a possible implementation, the apparatus further includes a first general-purpose data adapter and a second general-purpose data adapter.

The first general-purpose data adapter is configured to: obtain downlink general-purpose data, encapsulate the downlink general-purpose data to obtain a third downlink packet, and send the third downlink packet to the first multiplexer.

The first multiplexer is specifically configured to multiplex the first downlink packet and the third downlink packet into the downlink data stream.

The second demultiplexer is specifically configured to demultiplex the first downlink packet and the third downlink packet from the downlink data stream.

The second demultiplexer is further configured to send the third downlink packet to the second general-purpose data adapter.

The second general-purpose data adapter is configured to decapsulate the third downlink packet to obtain the downlink general-purpose data.

The second general-purpose data adapter is further configured to: obtain uplink general-purpose data, encapsulate the uplink general-purpose data to obtain a third uplink packet, and send the third uplink packet to the second multiplexer.

The second multiplexer is specifically configured to multiplex the first uplink packet and the third uplink packet into the uplink data stream.

The first demultiplexer is specifically configured to demultiplex the first uplink packet and the third uplink packet from the uplink data stream.

The first demultiplexer is further configured to send the third uplink packet to the first general-purpose data adapter.

The first general-purpose data adapter is further configured to decapsulate the third uplink packet to obtain the uplink general-purpose data.

According to the transmission system provided in this embodiment of the present disclosure, bidirectional transmission of general-purpose data can be further implemented between the peer devices through the cable. That is, bidirectional transmission of the media signal and the general-purpose data can be implemented between the peer devices through the cable.

In a possible implementation, the apparatus further includes a first third-party protocol adapter, a second third-party protocol adapter, a first general-purpose data adapter, and a second general-purpose data adapter.

The first third-party protocol adapter is configured to: obtain a downlink third-party protocol signal, encapsulate the downlink third-party protocol signal to obtain a second downlink packet, and send the second downlink packet to the first multiplexer.

The first general-purpose data adapter is configured to: obtain downlink general-purpose data, encapsulate the downlink general-purpose data to obtain a third downlink packet, and send the third downlink packet to the first multiplexer.

The first multiplexer is specifically configured to multiplex the first downlink packet, the second downlink packet, and the third downlink packet into the downlink data stream.

The second demultiplexer is specifically configured to demultiplex the first downlink packet, the second downlink packet, and the third downlink packet from the downlink data stream.

The second demultiplexer is further configured to: send the second downlink packet to the second third-party protocol adapter, and send the third downlink packet to the second general-purpose data adapter.

The second third-party protocol adapter is configured to decapsulate the second downlink packet to obtain the downlink third-party protocol signal.

The second general-purpose data adapter is configured to decapsulate the third downlink packet to obtain the downlink general-purpose data.

The second third-party protocol adapter is further configured to: obtain an uplink third-party protocol signal, encapsulate the uplink third-party protocol signal to obtain a second uplink packet, and send the second uplink packet to the second multiplexer.

The second general-purpose data adapter is further configured to: obtain uplink general-purpose data, encapsulate the uplink general-purpose data to obtain a third uplink packet, and send the third uplink packet to the second multiplexer.

The second multiplexer is specifically configured to multiplex the first uplink packet, the second uplink packet, and the third uplink packet into the uplink data stream.

The first demultiplexer is specifically configured to demultiplex the first uplink packet, the second uplink packet, and the third uplink packet from the uplink data stream.

The first demultiplexer is further configured to: send the second uplink packet to the first third-party protocol adapter, and send the third uplink packet to the first general-purpose data adapter.

The first third-party protocol adapter is further configured to decapsulate the second uplink packet to obtain the uplink third-party protocol signal.

The first general-purpose data adapter is further configured to decapsulate the third uplink packet to obtain the uplink general-purpose data.

According to the transmission system provided in this embodiment of the present disclosure, bidirectional transmission of a third-party protocol signal and general-purpose data can be further implemented between the peer devices through the cable. That is, bidirectional transmission of at least one of the media signal, the third-party protocol signal, and the general-purpose data can be implemented between the peer devices in a time division multiplexing manner through the cable.

In a possible implementation, the apparatus may further include a first management and control adapter and a second management and control adapter. The first cable further includes a sideband link lane. The first management and control adapter and the second management and control adapter are configured to implement, through the sideband link lane, at least one of the following functions: plug detection, flip identification, high-speed transmission link training information exchange, device capability information obtaining, device status information obtaining, discovery and establishment of a network topology structure, content protection information exchange, and device interoperation.

In a possible implementation, the system may further include a routing network. The first transmission apparatus is connected to the routing network through the first cable. The routing network is connected to the second transmission apparatus, and the routing network is used to route and forward the uplink data stream and the downlink data stream that are between the first transmission apparatus and the second transmission apparatus.

The first lane allocator is specifically configured to send the downlink data stream to the routing network.

The first lane deallocator is specifically configured to receive the uplink sub-data stream from the routing network.

In a possible implementation, the system may further include a routing network. The second transmission apparatus is connected to the routing network through the first cable. The routing network is connected to the first transmission apparatus, and the routing network is used to route and forward the uplink data stream and the downlink data stream that are between the first transmission apparatus and the second transmission apparatus.

The second lane deallocator is specifically configured to receive the downlink sub-data stream from the routing network.

The second lane allocator is specifically configured to send the uplink data stream to the routing network.

In a possible implementation, the routing network includes at least one level of routing device.

In a possible implementation, the network topology structure of the transmission system is mesh-shaped.

In the existing transmission system, a source device, a branch (branch) device (or a switching device (switch)), and a sink device form a "tree-shaped" network topology structure. For example, one source device and a plurality of sink devices form a "tree-shaped" network topology structure by using the branch device/switching device, so that unidirectional or bidirectional transmission of a data stream may be implemented between the source device and the plurality of sink devices by using the branch device/switching device. For another example, a plurality of source devices and one sink device may form a "tree-shaped" network topology structure by using the branch device/switching device, so that unidirectional or bidirectional transmission of a data stream may be implemented between the sink device and the plurality of source devices by using the branch device/switching device.

However, in the transmission system provided in this embodiment of the present disclosure, (one or more) source devices and (one or more) sink devices may form a "mesh-shaped" network topology structure by using the routing network, so that bidirectional transmission of the media signal may be implemented between any two peer devices through routing and forwarding of the routing network, and further, bidirectional transmission of the media signal, the general-purpose data, and/or the third-party protocol signal may be implemented. This can expand an application scenario of the system.

Optionally, composition of a first sub-cable may be different from composition of a second sub-cable. For example, the first sub-cable includes a third number of sub-downlink lanes and a fourth number of sub-uplink lanes, and the second sub-cable includes a fifth number of sub-downlink lanes and a sixth number of sub-uplink lanes.

In a possible implementation, the third number may be greater than or equal to the fourth number, and the fifth number may be greater than or equal to the sixth number.

Optionally, the third number and/or the fifth number may be equal to the first number, and the fourth number and/or the sixth number may be equal to the second number.

According to a second aspect, an embodiment of the present disclosure further provides a transmission apparatus. The transmission apparatus may be the first transmission apparatus in the first aspect or the possible implementations of the first aspect.

For a specific structure and design in the transmission apparatus provided in the second aspect, refer to the description of the first aspect.

In a possible implementation, the transmission apparatus provided in the second aspect may be (or integrated into) a source device.

According to a third aspect, an embodiment of the present disclosure further provides another transmission apparatus. The transmission apparatus may be the second transmission apparatus in the first aspect or the possible implementations of the first aspect.

For a specific structure and design in the transmission apparatus provided in the third aspect, refer to the description of the first aspect.

In a possible implementation, the transmission apparatus provided in the third aspect may be (or integrated into) a sink device.

According to a fourth aspect, an embodiment of the present disclosure provides a transmission method. The method may be applied to a transmission system. The system may include a first transmission apparatus and a second transmission apparatus. The first transmission apparatus is connected to the second transmission apparatus through a first cable, and the first cable includes a first number of main downlink lanes and a second number of main uplink lanes. The method includes: The first transmission apparatus obtains a downlink media signal, where the downlink media signal includes a downlink video signal and/or a downlink audio signal. The first transmission apparatus encapsulates the downlink media signal to obtain a first downlink packet. The first transmission apparatus pads the first downlink packet into a downlink data stream. The first transmission apparatus allocates a padded downlink data stream to a first main downlink lane, and sends the padded downlink data stream to the second transmission apparatus, where the first main downlink lane includes at least one main downlink lane in the first number of main downlink lanes. The second transmission apparatus combines downlink sub-data streams received through the first main downlink lane into the downlink data stream. The second transmission apparatus extracts the first downlink packet from the downlink data stream. The second transmission apparatus decapsulates the first downlink packet to obtain the downlink media signal. The second transmission apparatus obtains an uplink media signal, where the uplink media signal includes an uplink video signal and/or an uplink audio signal. The second transmission apparatus encapsulates the uplink media signal to obtain a first uplink packet. The second transmission apparatus pads the first uplink packet into an uplink data stream. The second transmission apparatus allocates a padded uplink data stream to a first main uplink lane, and sends the padded uplink data stream to the first transmission apparatus, where the first main uplink lane includes at least one main uplink lane in the second number of main uplink lanes. The first transmission apparatus combines uplink sub-data streams received through the first main uplink lane into the uplink data stream. The first transmission apparatus extracts the first uplink packet from the uplink data stream. The first transmission apparatus decapsulates the first uplink packet to obtain the uplink media signal.

It should be noted that the first transmission apparatus may be (or integrated into) a source device, and the second transmission apparatus may be (integrated into) a sink device.

It should be further noted that a media signal in the present disclosure may also be referred to as an audio/video signal.

For example, the downlink media signal may also be referred to as a downlink audio/video signal, and the uplink media signal may also be referred to as an uplink audio/video signal.

According to the transmission method provided in this embodiment of the present disclosure, bidirectional transmission of the media signal can be implemented between peer devices through a cable.

In a possible implementation, the encapsulation and the decapsulation in this embodiment of the present disclosure are performed based on a unified transport protocol (for example, a first transport protocol).

According to the transmission method provided in this embodiment of the present disclosure, because the first downlink packet sent by the source device is obtained by performing one-layer encapsulation on the downlink media signal based on the first transport protocol, after receiving the first downlink packet, the sink device may perform one-layer decapsulation based on the first transport protocol to obtain the downlink media signal. Similarly, because the first uplink packet sent by the sink device is obtained by performing one-layer encapsulation on the uplink media signal based on the first transport protocol, after receiving the first uplink packet, the source device may perform one-layer decapsulation based on the first transport protocol to obtain the uplink media signal.

In addition, the media signal in this embodiment of the present disclosure is a generated or collected original media signal, including a clock signal, a vertical synchronization signal, a horizontal synchronization signal, display enabling, video data, audio data, and the like. In an actual application scenario, bidirectional transmission of a data stream is performed between the source device and the sink device in a wired manner (that is, through a cable), only one-layer encapsulation/decapsulation may be performed on the media signal, and video encoding/decoding (for example, H.264, H.265, and AVS2/3) is not required. Therefore, this can reduce complexity of a signal source of the media signal and the sink device, reduce an image quality loss caused by video encoding/decoding, and reduce a delay caused by video encoding/decoding, to improve transmission efficiency and user experience.

In a possible implementation, the first number is greater than or equal to the second number.

Further, the first number may be greater than the second number.

According to the transmission system provided in this embodiment of the present disclosure, asymmetric bidirectional transmission (in other words, the first number is not equal to the second number) can be implemented between the source device and the sink device, for example, the first number may be greater than the second number, to meet a requirement of asymmetric bidirectional transmission in which a downlink transmission rate is greater than an uplink transmission rate in an actual application.

In a possible implementation, the method may further include: The first transmission apparatus obtains a downlink third-party protocol signal. The first transmission apparatus encapsulates the downlink third-party protocol signal to obtain a second downlink packet. That the first transmission apparatus pads the first downlink packet into a downlink data stream includes: The first transmission apparatus multiplexes the first downlink packet and the second downlink packet into the downlink data stream.

Correspondingly, that the second transmission apparatus extracts the first downlink packet from the downlink data stream includes: The second transmission apparatus demultiplexes the first downlink packet and the second downlink packet from the downlink data stream. The method may further include: The second transmission apparatus decapsulates the second downlink packet to obtain the downlink third-party protocol signal.

In a possible implementation, the method may further include: The second transmission apparatus obtains an uplink third-party protocol signal. The second transmission apparatus encapsulates the uplink third-party protocol signal to obtain a second uplink packet. That the second transmission apparatus pads the first uplink packet into an uplink data stream includes: The second transmission apparatus multiplexes the first uplink packet and the second uplink packet into the uplink data stream.

Correspondingly, that the first transmission apparatus extracts the first uplink packet from the uplink data stream includes: The first transmission apparatus demultiplexes the first uplink packet and the second uplink packet from the uplink data stream. The method may further include: The first transmission apparatus decapsulates the second uplink packet to obtain the uplink third-party protocol signal.

According to the transmission method provided in this embodiment of the present disclosure, bidirectional transmission of a third-party protocol signal can be further implemented between the peer devices through the cable. That is, bidirectional transmission of the media signal and the third-party protocol signal can be implemented between the peer devices through the cable.

In a possible implementation, the method may further include: The first transmission apparatus obtains downlink general-purpose data. The first transmission apparatus encapsulates the downlink general-purpose data to obtain a third downlink packet. That the first transmission apparatus pads the first downlink packet into a downlink data stream includes: The first transmission apparatus multiplexes the first downlink packet and the third downlink packet into the downlink data stream.

Correspondingly, that the second transmission apparatus extracts the first downlink packet from the downlink data stream includes: The second transmission apparatus demultiplexes the third downlink packet from the downlink data stream. The method may further include: The second transmission apparatus decapsulates the third downlink packet to obtain the downlink general-purpose data.

In a possible implementation, the method may further include: The second transmission apparatus obtains uplink general-purpose data. The second transmission apparatus encapsulates the uplink general-purpose data to obtain a third uplink packet. That the second transmission apparatus pads the first uplink packet into an uplink data stream includes: The second transmission apparatus multiplexes the first uplink packet and the third uplink packet into the uplink data stream.

Correspondingly, that the first transmission apparatus extracts the first uplink packet from the uplink data stream includes: The first transmission apparatus demultiplexes the first uplink packet and the third uplink packet from the uplink data stream. The method may further include: The first transmission apparatus decapsulates the third uplink packet to obtain the uplink general-purpose data.

According to the transmission method provided in this embodiment of the present disclosure, bidirectional transmission of general-purpose data can be further implemented between the peer devices through the cable. That is, bidirectional transmission of the media signal and the general-purpose data can be implemented between the peer devices through the cable.

In a possible implementation, the method may further include: The first transmission apparatus obtains a downlink third-party protocol signal. The first transmission apparatus encapsulates the downlink third-party protocol signal to obtain a second downlink packet. The first transmission apparatus obtains downlink general-purpose data. The first transmission apparatus encapsulates the downlink general-purpose data to obtain a third downlink packet. That the first transmission apparatus pads the first downlink packet into a downlink data stream includes: The first transmission apparatus multiplexes the first downlink packet, the second downlink packet, and the third downlink packet into the downlink data stream.

Correspondingly, that the second transmission apparatus extracts the first downlink packet from the downlink data stream includes: The second transmission apparatus demultiplexes the first downlink packet, the second downlink packet, and the third downlink packet from the downlink data stream. The method may further include: The second transmission apparatus decapsulates the second downlink packet to obtain the downlink third-party protocol signal. The second transmission apparatus decapsulates the third downlink packet to obtain the downlink general-purpose data.

In a possible implementation, the method may further include: The second transmission apparatus obtains an uplink third-party protocol signal. The second transmission apparatus encapsulates the uplink third-party protocol signal to obtain a second uplink packet. The second transmission apparatus obtains uplink general-purpose data. The second transmission apparatus encapsulates the uplink general-purpose data to obtain a third uplink packet. That the second transmission apparatus pads the first uplink packet into an uplink data stream includes: The second transmission apparatus multiplexes the first uplink packet, the second uplink packet, and the third uplink packet into the uplink data stream.

Correspondingly, that the first transmission apparatus extracts the first uplink packet from the uplink data stream includes: The first transmission apparatus demultiplexes the first uplink packet, the second uplink packet, and the third uplink packet from the uplink data stream. The method may further include: The first transmission apparatus decapsulates the second uplink packet to obtain the uplink third-party protocol signal. The first transmission apparatus decapsulates the third uplink packet to obtain the uplink general-purpose data.

According to the transmission system provided in this embodiment of the present disclosure, bidirectional transmission of a third-party protocol signal and general-purpose data can be further implemented between the peer devices through the cable. That is, bidirectional transmission of at least one of the media signal, the third-party protocol signal, and the general-purpose data can be implemented between the peer devices in a time division multiplexing manner through the cable.

In a possible implementation, the first cable further includes a sideband link lane. The sideband link lane is configured to implement at least one of the following functions: plug detection, flip identification, high-speed transmission link training information exchange, device capability information obtaining, device status information obtaining, discovery and establishment of a network topology structure, content protection information exchange, and device interoperation.

In a possible implementation, the system may further include a routing network. The first transmission apparatus is connected to the routing network through the first cable. The routing network is connected to the second transmission apparatus. The routing network is used to route and forward the uplink data stream and the downlink data stream that are between the first transmission apparatus and the second transmission apparatus. That the first transmission apparatus sends the downlink data stream to the second transmission apparatus includes: The first transmission apparatus sends the downlink data stream to the routing network.

In a possible implementation, the system may further include a routing network. The second transmission apparatus is connected to the routing network through the first cable. The routing network is connected to the first transmission apparatus. The routing network is used to route and forward the uplink data stream and the downlink data stream that are between the first transmission apparatus and the second transmission apparatus. That the second transmission apparatus sends the uplink data stream to the first transmission apparatus includes: The second transmission apparatus sends the uplink data stream to the routing network.

In a possible implementation, the routing network includes at least one level of routing device.

In a possible implementation, the network topology structure of the transmission system is mesh-shaped.

In the existing transmission method, a source device, a branch device (or a switching device), and a sink device form a "tree-shaped" network topology structure. For example, one source device and a plurality of sink devices form a "tree-shaped" network topology structure by using the branch device/switching device, so that unidirectional or bidirectional transmission of a data stream may be implemented between the source device and the plurality of sink devices by using the branch device/switching device. For another example, a plurality of source devices and one sink device may form a "tree-shaped" network topology structure by using the branch device/switching device, so that unidirectional or bidirectional transmission of a data stream may be implemented between the sink device and the plurality of source devices by using the branch device/switching device.

However, in the transmission method provided in this embodiment of the present disclosure, (one or more) source devices and (one or more) sink devices may form a "mesh-shaped" network topology structure by using the routing network, so that bidirectional transmission of the media signal may be implemented between any two peer devices through routing and forwarding of the routing network, and further, bidirectional transmission of the media signal, the general-purpose data, and/or the third-party protocol signal may be implemented. This can expand an application scenario of the system.

Optionally, composition of a first sub-cable may be different from composition of a second sub-cable. For example, the first sub-cable includes a third number of sub-downlink lanes and a fourth number of sub-uplink lanes, and the second sub-cable includes a fifth number of sub-downlink lanes and a sixth number of sub-uplink lanes.

In a possible implementation, the third number may be greater than or equal to the fourth number, and the fifth number may be greater than or equal to the sixth number.

Optionally, the third number and/or the fifth number may be equal to the first number, and the fourth number and/or the sixth number may be equal to the second number.

According to a fifth aspect, the present disclosure further provides a transmission method. The method may include the steps performed by the first transmission apparatus in the fourth aspect or the possible implementations of the fourth aspect.

According to a sixth aspect, the present disclosure further provides a transmission method. The method may include the steps performed by the second transmission apparatus in the fourth aspect or the possible implementations of the fourth aspect.

DESCRIPTION OF EMBODIMENTS

The following describes the technical solutions in embodiments of the present disclosure with reference to the accompanying drawings in embodiments of the present disclosure.

Some terms in embodiments of the present disclosure are first described.

1. Peer Device

The peer device may include a source device, a sink device, and a docking station.

2. Source Device

The source device is a device that can generate an audio/video signal.

For example, the source device may be a set-top box, a digital versatile disc (DVD) player, a personal computer (PC), a game console, and a host of a split-type television.

3. Sink Device

The sink device is responsible for receiving an audio/video signal provided by a source device and outputting the audio/video signal, for example, displaying a video on a display screen or playing audio by using a speaker.

For example, the sink device may be a display screen or sound box of a television or split-type television.

4. Docking Station

The docking station, also referred to as a port replicator, copies or even extends a port of an electronic device such as a laptop computer, so that the electronic device is directly connected to a plurality of accessories or external devices, such as a power adapter, a network cable, a mouse, an external keyboard, a printer, and an external display.

5. Routing Device

The routing device is a device that has a routing function. The routing function is a function of determining a transmission path of a data stream from a source to a destination.

For example, a routing device including a plurality of ports may select transmission paths for data streams at the plurality of ports.

First, a transmission system to which a transmission method provided in embodiments of the present disclosure is applied is described.

Figure 1:
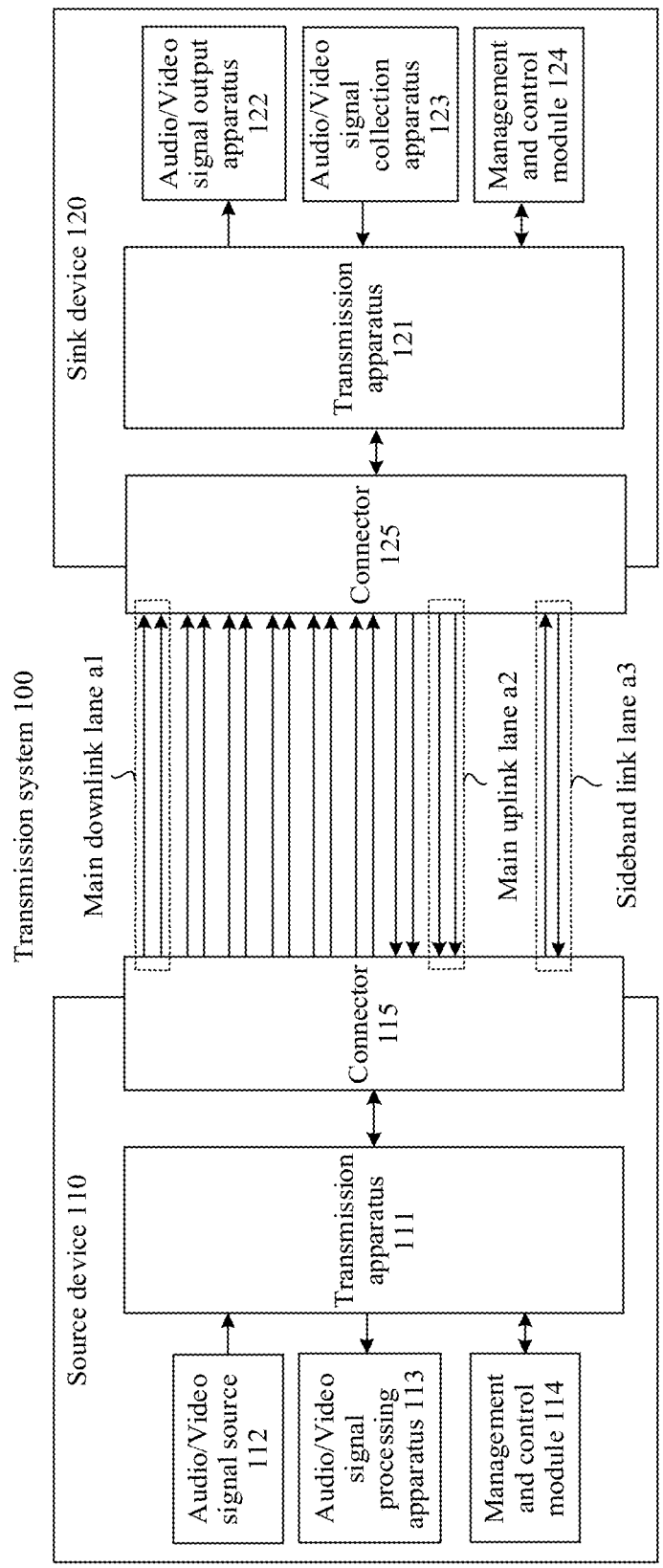
FIG. 1 is a schematic block diagram of a transmission system 100 according to an embodiment of the present disclosure.
Figure 2:
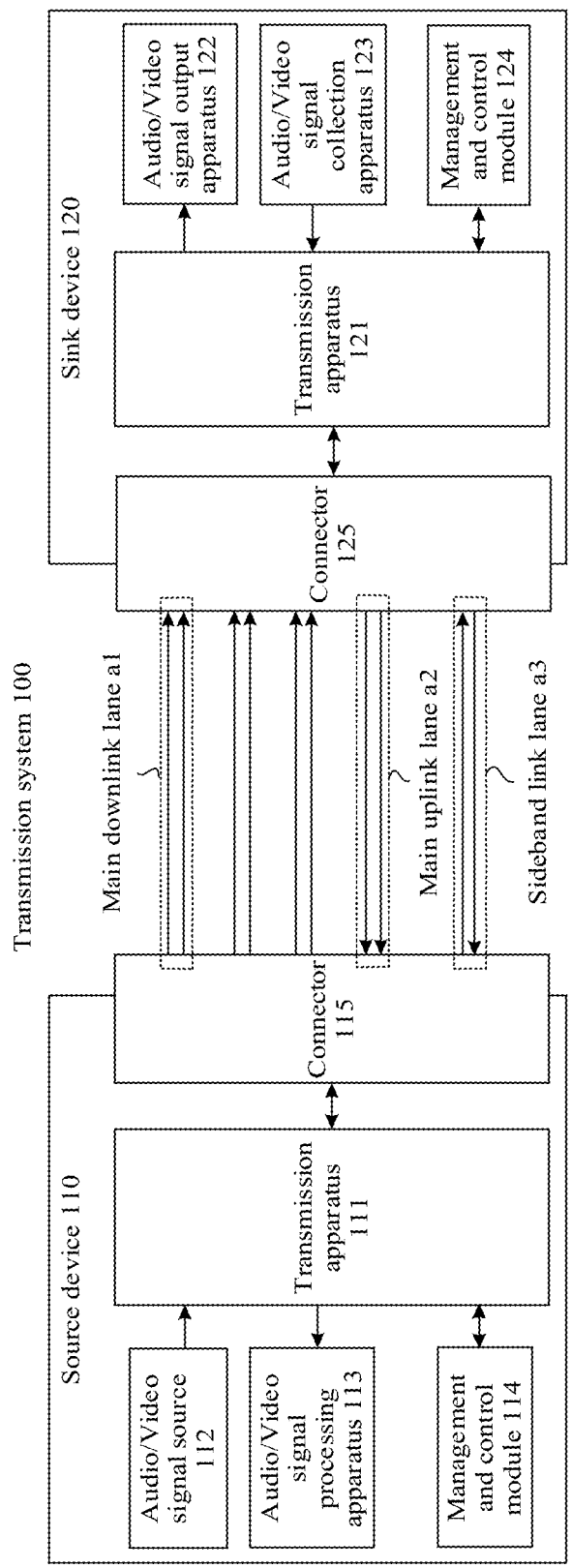
FIG. 2 is another schematic block diagram of a transmission system 100 according to an embodiment of the present disclosure.

FIG. 1 and FIG. 2 each are a schematic block diagram of a transmission system 100 according to an embodiment of the present disclosure. As shown in FIG. 1 and FIG. 2, the system 100 may include at least one source device (a source device 110 shown in FIG. 1 and FIG. 2) and at least one sink device (a sink device 120 shown in FIG. 1 and FIG. 2).

In FIG. 1 and FIG. 2, the source device 110 may include a transmission apparatus 111, an audio/video signal source 112, an audio/video signal processing apparatus 113, a management and control module 114, and a connector 115.

In FIG. 1 and FIG. 2, the sink device 120 may include a transmission apparatus 121, an audio/video signal output apparatus 122, an audio/video signal collection apparatus 123, a management and control module 124, and a connector 125.

In addition, the connector 115 is connected to the connector 125 through a cable (namely, a first cable). The cable may include a plurality of main link lanes. The plurality of main link lanes may include a first number of main downlink lanes (for example, six main downlink lanes a1 shown in FIG. 1 or three main downlink lanes a1 shown in FIG. 2) and a second number of main uplink lanes (for example, two main uplink lanes a2 shown in FIG. 1 or one main uplink lane a2 shown in FIG. 2).

Optionally, the audio/video signal source 112, the audio/video signal processing apparatus 113, the management and control module 114, the audio/video signal output apparatus 122, the audio/video signal collection apparatus 123, and the management and control module 124 may be implemented by hardware, may be implemented by software, or may be implemented by a combination of software and hardware. The connector 115 and the connector 125 may be implemented by hardware. This is not limited in this embodiment of the present disclosure.

It should be noted that the sink device in this embodiment of the present disclosure may alternatively be a docking station. For clarity, only the sink device is used as an example for description in this embodiment of the present disclosure. However, the present disclosure is not limited thereto.

In a possible implementation, bidirectional transmission of an audio/video signal between the transmission apparatus 111 and the transmission apparatus 121 may be performed through the plurality of main link lanes.

Optionally, the audio/video signal in this embodiment of the present disclosure may include a video signal and/or an audio signal. This is not limited in this embodiment of the present disclosure.

It should be noted that the audio/video signal in this embodiment of the present disclosure may also be referred to as a media signal, and the media signal includes the video signal and/or the audio signal.

It should be noted that, in this embodiment of the present disclosure, bidirectional transmission includes uplink transmission and downlink transmission. The downlink transmission is from a source device to a sink device (or a docking station), and the uplink transmission is from the sink device (or the docking station) to the source device.

It should be further noted that, in this embodiment of the present disclosure, a data stream transmitted on a downlink is referred to as a downlink data stream, and a data stream transmitted on an uplink is referred to as an uplink data stream.

It should be noted that, in this embodiment of the present disclosure, the main downlink lane is used to transmit the downlink data stream, and the main uplink lane is used to transmit the uplink data stream.

The following describes a process in which bidirectional transmission of the audio/video signal between the transmission apparatus 111 and the transmission apparatus 121 is performed through the plurality of main link lanes.

1. Downlink Transmission Process

The audio/video signal source 112 is configured to: generate a downlink audio/video signal, and send the downlink audio/video signal to the transmission apparatus 111.

In a possible implementation, the downlink audio/video signal includes a clock signal 1, a vertical synchronization signal 1, a horizontal synchronization signal 1, display enabling 1, video data 1, and audio data 1.

The transmission apparatus 111 is configured to: receive the downlink audio/video signal from the audio/video signal source 112, encapsulate the downlink audio/video signal based on a first transport protocol to obtain a downlink packet 1 (namely, a first downlink packet), and send the downlink packet 1 to the transmission apparatus 121.

In a possible implementation, the transmission apparatus 111 is specifically configured to send the downlink packet 1 to the transmission apparatus 121 through a first main downlink lane. The first main downlink lane includes at least one main downlink lane in the first number of main downlink lanes.

The transmission apparatus 121 is configured to: decapsulate the downlink packet 1 based on the first transport protocol to obtain the downlink audio/video signal, and send the downlink audio/video signal to the media output apparatus 122.

In a possible implementation, the transmission apparatus 121 is specifically configured to receive the downlink packet 1 from the transmission apparatus 111 through the first main downlink lane.

The audio/video signal output apparatus 122 is configured to output the downlink audio/video signal.

Optionally, a specific form of the media output apparatus 122 is not limited in this embodiment of the present disclosure.

In a possible implementation, if the downlink audio/video signal includes a downlink audio signal, and the media output apparatus 122 is a sound box, the media output apparatus 122 is specifically configured to play the downlink audio signal.

In another possible implementation, if the downlink audio/video signal includes a downlink video signal, and the media output apparatus 122 is a display screen, the media output apparatus 122 is specifically configured to display the downlink video signal.

2. Uplink Transmission Process

The audio/video signal collection apparatus 123 is configured to: collect an uplink audio/video signal, and send the uplink audio/video signal to the transmission apparatus 121.

In a possible implementation, the uplink audio/video signal includes a clock signal 2, a vertical synchronization signal 2, a horizontal synchronization signal 2, display enabling 2, video data 2, and audio data 2.

The transmission apparatus 121 is configured to: encapsulate the uplink audio/video signal based on the first transport protocol to obtain an uplink packet 1 (namely, a first uplink packet), and send the uplink packet 1 to the transmission apparatus 111.

In a possible implementation, the transmission apparatus 121 is specifically configured to send the uplink packet 1 to the transmission apparatus 111 through a first main uplink lane. The first main uplink lane includes at least one main uplink lane in the second number of main uplink lanes.

The transmission apparatus 111 is configured to: decapsulate the uplink packet 1 based on the first transport protocol to obtain the uplink audio/video signal, and send the uplink audio/video signal to the audio/video signal processing apparatus 113.

In a possible implementation, the transmission apparatus 111 is specifically configured to receive the uplink packet 1 from transmission apparatus 121 through the first main uplink lane.

The audio/video signal processing apparatus 113 is configured to process the uplink audio/video signal.

According to the transmission system provided in this embodiment of the present disclosure, a full-process solution based on a unified transport protocol is provided for data transmission between the source device and the sink device. Bidirectional transmission of the audio/video signal between the source device and the sink device that use the solution may be performed through the plurality of main link lanes.

In addition, because the first downlink packet sent by the source device is obtained by performing one-layer encapsulation on the downlink audio/video signal based on the first transport protocol, after receiving the first downlink packet, the sink device may perform one-layer decapsulation based on the first transport protocol to obtain the downlink audio/video signal. Similarly, because the first uplink packet sent by the sink device is obtained by performing one-layer encapsulation on the uplink audio/video signal based on the first transport protocol, after receiving the first uplink packet, the source device may perform one-layer decapsulation based on the first transport protocol to obtain the uplink audio/video signal.

In addition, the audio/video signal in this embodiment of the present disclosure is a generated or collected original audio/video signal, including a clock signal, a vertical synchronization signal, a horizontal synchronization signal, display enabling, video data, audio data, and the like. In an actual application scenario, bidirectional transmission of a data stream is performed between the source device and the sink device in a wired manner (that is, through a cable), only one-layer encapsulation/decapsulation may be performed on the audio/video signal, and video encoding/decoding (for example, H.264, H.265, and AVS2/3) is not required. Therefore, this can reduce complexity of a signal source of the audio/video signal and the sink device, reduce an image quality loss caused by video encoding/decoding, and reduce a delay caused by video encoding/decoding, to improve transmission efficiency and user experience.

Optionally, the main link lane (lane) in this embodiment of the present disclosure may be implemented in a plurality of manners. This is not limited in this embodiment of the present disclosure.

In a possible implementation, as shown in FIG. 1 and FIG. 2, the main link lane may be a differential lane, and one differential lane may include one differential cable pair.

In another possible implementation, the main link lane may be an optical lane, and one optical lane may be an optical fiber or a lane formed by a specific wavelength in the optical fiber.

It should be noted that a single lane supports only unidirectional transmission, that is, downlink transmission or uplink transmission. The single lane may support working at a plurality of transmission rates. Transmission rates of lanes for codirectional transmission are the same, and transmission rates of lanes for reverse transmission may be the same or may be different.

For example, the single lane can support 2 gigabits per second (Gbps), 4 Gbps, 6 Gbps, 8 Gbps, 12 Gbps, 16 Gbps, 24 Gbps, or other transmission rates.

Optionally, a number of the plurality of main link lanes is not limited in this embodiment of the present disclosure.

In a possible implementation, as shown in FIG. 1, the number of the plurality of main link lanes may be 8.

In a possible implementation, as shown in FIG. 2, the number of the plurality of main link lanes may be 4.

Optionally, the first number and the second number are not limited in this embodiment of the present disclosure.

In a possible implementation, the first number may be greater than or equal to the second number. Further, the first number may be greater than the second number.

For example, the number of the plurality of main link lanes is 8, and a transmission rate of each main link lane is 24 Gbps. The eight main link lanes may use a configuration mode shown in Table 1.

TABLE 1

| Configuration mode | Transmission apparatus 111 | Transmission apparatus 121 | Maximum transmission rate |
|---|---|---|---|
| 6 + 2 | 6 transmit (TX) + 2 receive (RX) | 6RX + 2TX | Downlink transmission: up to 144 Gbps<br>Uplink transmission: up to 48 Gbps |
| 4 + 4 | 4TX + 4RX | 4RX + 4TX | Downlink transmission: up to 96 Gbps<br>Uplink transmission: up to 96 Gbps |

For example, the configuration mode 6+2 in Table 1 is used as an example. The eight main link lanes may be divided into six main downlink lanes and two main uplink lanes. A maximum downlink transmission rate of the six main downlink lanes is 144 Gbps, and a maximum uplink transmission rate of the two main uplink lanes is 48 Gbps.

It should be noted that Table 1 merely shows the configuration mode 6+2 and the configuration mode 4+4 as an example, but this embodiment of the present disclosure is not limited thereto. Optionally, the eight main link lanes may be further configured in another configuration mode, for example, a configuration mode 8+0 or a configuration mode 0+8. This is not limited in this embodiment of the present disclosure.

For example, the number of the plurality of main link lanes is 4, and a transmission rate of each main link lane is 24 Gbps. The four main link lanes may use a configuration mode shown in Table 2.

TABLE 2

| Configuration mode | Transmission apparatus 111 | Transmission apparatus 121 | Maximum transmission rate |
|---|---|---|---|
| 3 + 1 | 3TX + 1RX | 3RX + 1TX | Downlink transmission: up to 72 Gbps<br>Uplink transmission: up to 24 Gbps |
| 2 + 2 | 2TX + 2RX | 2RX + 2TX | Downlink transmission: up to 48 Gbps<br>Uplink transmission: up to 48 Gbps |

For example, the configuration mode 3+1 in Table 2 is used as an example. The four main link lanes may be divided into three main downlink lanes and one main uplink lane. A maximum downlink transmission rate of the three main downlink lanes is 72 Gbps, and a maximum uplink transmission rate of the one main uplink lane is 24 Gbps.

It should be noted that Table 2 merely shows the configuration mode 3+1 and the configuration mode 2+2 as an example, but this embodiment of the present disclosure is not limited thereto. Optionally, the four main link lanes may be further configured in another configuration mode, for example, a configuration mode 4+0 or a configuration mode 0+4. This is not limited in this embodiment of the present disclosure.

According to the transmission system provided in this embodiment of the present disclosure, asymmetric bidirectional transmission (in other words, the first number is not equal to the second number) can be implemented between the source device and the sink device, for example, the first number may be greater than the second number, to meet a requirement of asymmetric bidirectional transmission in which a downlink transmission rate is greater than an uplink transmission rate in an actual application.

Optionally, as shown in FIG. 1 and FIG. 2, the cable may further include a sideband link lane (a sideband link lane shown in FIG. 1 or a sideband link lane shown in FIG. 2).

Optionally, the sideband link lane in this embodiment of the present disclosure may be implemented in a plurality of manners. This is not limited in this embodiment of the present disclosure.

In a possible implementation, as shown in FIG. 1 and FIG. 2, one sideband link lane may include one sideband pair, and the sideband pair may include a downlink sideband and an uplink sideband.

In a possible implementation, the sideband pair may work in a full-duplex transmission mode.

In a possible implementation, the transmission apparatus 111 and the transmission apparatus 121 may implement, through the sideband link lane, at least one of the following auxiliary functions: plug detection, flip identification, high-speed transmission link training information exchange, device capability information obtaining, device status information obtaining, discovery and establishment of a network topology structure, content protection information exchange, and device interoperation.

The following describes functions of the transmission apparatus 111 and the management and control module 114 in a process of implementing each auxiliary function.

The transmission apparatus 111 is configured to: generate a control command 1 (or data 1 or a signal 1), and report the control command 1 (or the data 1 or the signal 1) to the management and control module 114.

The management and control module 114 is configured to perform corresponding processing based on the control command 1 (or the data 1 or the signal 1).

For example, the management and control module 114 receives the control command 1, and the control command 1 indicates that a port 139 is connected to a port 149. In this case, an operation of reading a capability of a peer end may be started.

For another example, the management and control module 114 receives the control command 1, and the control command 1 indicates that the cable is reversely connected between the connector 115 and the connector 125. In this case, related line sequence configuration is adjusted.

The management and control module 114 is further configured to: generate a control command 2 (or data 2 or a signal 2), and send the control command 2 (or the data 2 or the signal 2) to the transmission apparatus 111.

The transmission apparatus 111 is further configured to perform corresponding processing based on the control command 2 (or the data 2 or the signal 2).

For example, a related parameter of the transmission apparatus is adjusted, or the control command 2 (or the data 2 or the signal 2) is transmitted to the transmission apparatus 121 through the downlink sideband.

The transmission apparatus 111 is further configured to: receive a control command 3 (or data 3 or a signal 3) from the transmission apparatus 121 through the uplink sideband, and perform corresponding processing based on the control command 3 (or the data 3 or the signal 3).

For example, a related parameter of the transmission apparatus is adjusted, or the control command 3 (or the data 3 or the signal 3) is sent to the management and control module 114 for processing.

The management and control module 114 is further configured to: receive the control command 3 (or the data 3 or the signal 3) from the transmission apparatus 111, and perform corresponding processing based on the control command 3 (or the data 3 or the signal 3).

For example, a volume up/down operation and a source switching operation are performed.

The management and control module 114 is further configured to: receive a control instruction input by a user, and send, by using the transmission apparatus 111 and through the downlink sideband, a control command 4 (or data 4 or a signal 4) corresponding to the control instruction to the transmission apparatus 121.

It should be noted that, for functions of the transmission apparatus 121 and the management and control module 124 in the process of implementing each auxiliary function, refer to the transmission apparatus 111 and the management and control module 114. To avoid repetition, details are not described herein again.

It should be further noted that, for the process in which the transmission apparatus 111 and the transmission apparatus 121 implement each auxiliary function through the sideband pair, refer to the conventional technology, or refer to the following further descriptions. Details are not described herein again.

Optionally, bidirectional transmission of at least one of an audio/video signal, general-purpose data, and a third-party protocol signal between the transmission apparatus 111 and the transmission apparatus 121 may be implemented in a time division multiplexing manner through the plurality of main link lanes.

It should be noted that the third-party protocol signal in this embodiment of the present disclosure is a signal that can support a third-party protocol, and the third-party protocol signal may implement transparent transmission of the third-party protocol through a protocol tunnel.

Optionally, the third-party protocol may include a Universal Serial Bus (USB) protocol, a Peripheral Component Interconnect Express (PCIe) protocol, and/or another third-party protocol.

For example, the third-party protocol signal may include a USB protocol signal and/or a PCIe protocol signal.

It should be noted that the general-purpose data in this embodiment of the present disclosure is a general-purpose data exchange solution, and may support both low-speed data exchange and high-speed data exchange. The general-purpose data supports mutual access and data exchange between devices through extension of an application layer.

Optionally, the general-purpose data may include data other than the audio/video signal and the third-party protocol signal.

For example, the general-purpose data may include data generated in a process in which the transmission apparatus 111 accesses and controls a mass storage device.

Figure 3:
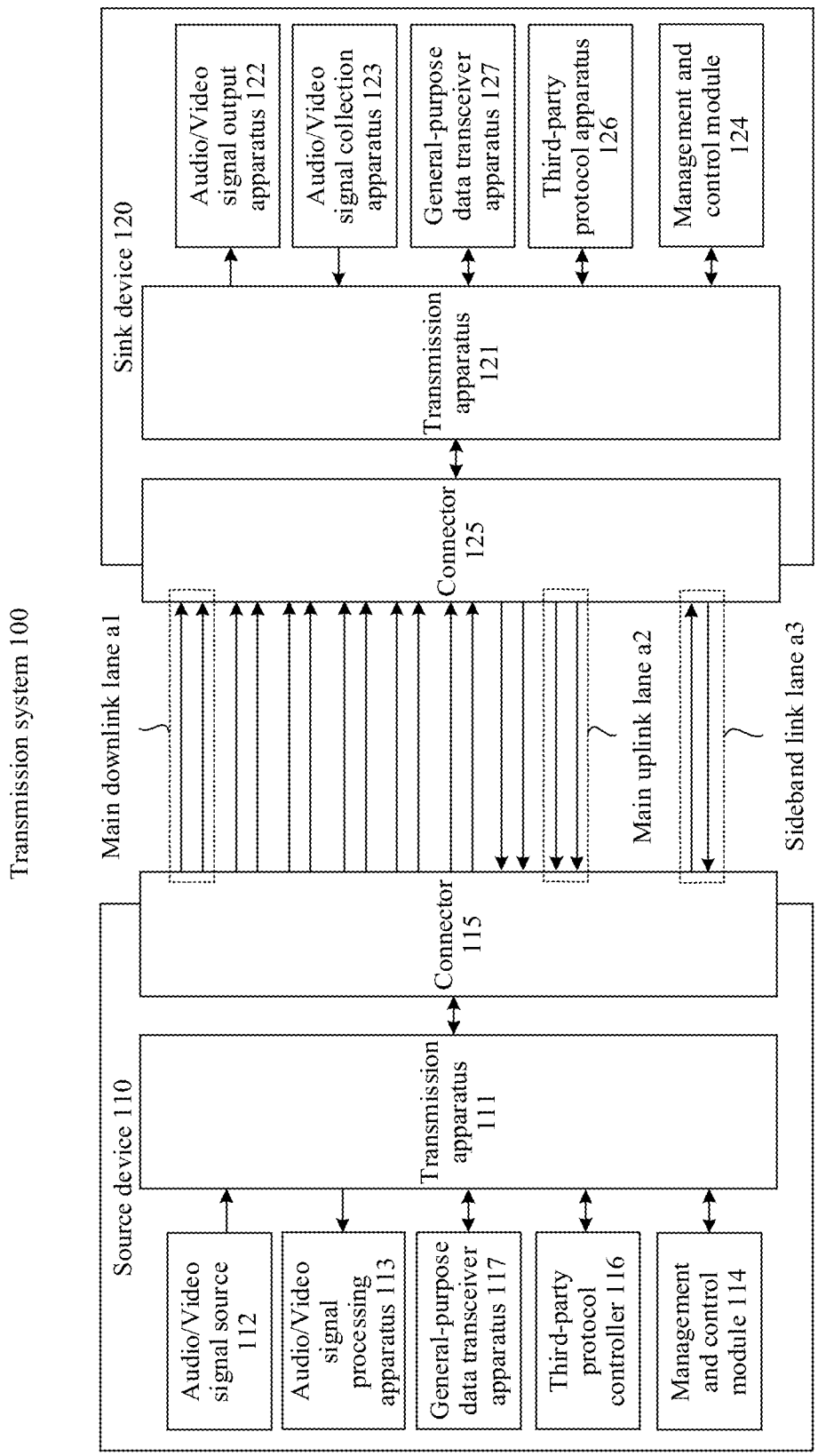
FIG. 3 is still another schematic block diagram of a transmission system 100 according to an embodiment of the present disclosure.

In a possible implementation, FIG. 3 is another schematic block diagram of the transmission system 100 according to an embodiment of the present disclosure. As shown in FIG. 3, the system 100 may include at least one source device (for example, the source device 110 shown in FIG. 3) and a sink device (for example, the sink device 120 shown in FIG. 3).

In FIG. 3, the source device 110 may include the transmission apparatus 111, the connector 115, the audio/video signal source 112, the audio/video signal processing apparatus 113, the management and control module 114, a third-party protocol controller 116, and a general-purpose data transceiver apparatus 117.

In FIG. 3, the sink device 120 may include the transmission apparatus 121, the connector 125, the audio/video signal output apparatus 122, the audio/video signal collection apparatus 123, the management and control module 124, a third-party protocol apparatus 126, and a general-purpose data transceiver apparatus 127.

In addition, the connector 115 is connected to the connector 125 through a cable (namely, a first cable). The cable includes a plurality of main link lanes. The plurality of main link lanes include a first number of main downlink lanes (for example, six main downlink lanes a1 shown in FIG. 3) and a second number of main uplink lanes (for example, two main uplink lanes a2 shown in FIG. 3).

It should be noted that, for a part that is not described in FIG. 3, refer to FIG. 1 and FIG. 2. To avoid repetition, details are not described herein again.

The following describes a process in which bidirectional transmission of an audio/video signal, general-purpose data, and a third-party protocol signal between the transmission apparatus 111 and the transmission apparatus 121 is performed through the plurality of main link lanes.

1. Downlink Transmission Process

The audio/video signal source 112 is configured to: generate a downlink audio/video signal, and send the downlink audio/video signal to the transmission apparatus 111.

In a possible implementation, the downlink audio/video signal includes a clock signal 1, a vertical synchronization signal 1, a horizontal synchronization signal 1, display enabling 1, video data 1, and audio data 1.

The transmission apparatus 111 is configured to encapsulate the downlink audio/video signal to obtain a downlink packet 1 (namely, a first downlink packet).

The third-party protocol controller 116 is configured to: generate a downlink third-party protocol signal, and send the downlink third-party protocol signal to the transmission apparatus 111.

The transmission apparatus 111 is further configured to encapsulate the downlink third-party protocol signal to obtain a downlink packet 2 (namely, a second downlink packet).

The general-purpose data transceiver apparatus 117 is configured to: generate downlink general-purpose data, and send the downlink general-purpose data to the transmission apparatus 111.

The transmission apparatus 111 is further configured to encapsulate the downlink general-purpose data to obtain a downlink packet 3 (namely, a third downlink packet).

The transmission apparatus 111 is further configured to send the downlink packet 1, the downlink packet 2, and the downlink packet 3 to the transmission apparatus 121 in a time division multiplexing manner.

In a possible implementation, the transmission apparatus 111 is specifically configured to send the downlink packet 1, the downlink packet 2, and the downlink packet 3 to the transmission apparatus 121 in the time division multiplexing manner through a first main downlink lane. The first main downlink lane includes at least one main downlink lane in the first number of main downlink lanes.

The transmission apparatus 121 is further configured to: decapsulate the downlink packet 1 to obtain the downlink audio/video signal, and send the downlink audio/video signal to the audio/video signal output apparatus 122.

The audio/video signal output apparatus 122 is configured to output the downlink audio/video signal.

The transmission apparatus 121 is further configured to: decapsulate the downlink packet 2 to obtain the downlink third-party protocol signal, and send the downlink third-party protocol signal to the third-party protocol apparatus 126.

The third-party protocol apparatus 126 is configured to process the downlink third-party protocol signal.

The transmission apparatus 121 is further configured to: decapsulate the downlink packet 3 to obtain the downlink general-purpose data, and send the downlink general-purpose data to the general-purpose data transceiver apparatus 127.

The general-purpose data transceiver apparatus 127 is configured to process the downlink general-purpose data.

In a possible implementation, the downlink packet 1, the downlink packet 2, and the downlink packet 3 all comply with a unified transport protocol, that is, all are encapsulated based on a unified transport protocol (for example, a first transport protocol).

2. Uplink Transmission Process

The audio/video signal collection apparatus 123 is configured to: generate an uplink audio/video signal, and send the uplink audio/video signal to the transmission apparatus 121.

In a possible implementation, the uplink audio/video signal includes a clock signal 2, a vertical synchronization signal 2, a horizontal synchronization signal 2, display enabling 2, video data 2, and audio data 2.

The transmission apparatus 121 is further configured to encapsulate the uplink audio/video signal to obtain an uplink packet 1 (namely, a first uplink packet).

The third-party protocol apparatus 126 is further configured to: generate an uplink third-party protocol signal, and send the uplink third-party protocol signal to the transmission apparatus 121.

The transmission apparatus 121 is further configured to encapsulate the uplink third-party protocol signal to obtain an uplink packet 2 (namely, a second uplink packet).

The general-purpose data transceiver apparatus 127 is further configured to: generate uplink general-purpose data, and send the uplink general-purpose data to the transmission apparatus 121.

The transmission apparatus 121 is further configured to encapsulate the uplink general-purpose data to obtain an uplink packet 3 (namely, a third uplink packet).

The transmission apparatus 121 is further configured to send the uplink packet 1, the uplink packet 2, and the uplink packet 3 to the transmission apparatus 111 in a time division multiplexing manner.

In a possible implementation, the transmission apparatus 121 is specifically configured to send the uplink packet 1, the uplink packet 2, and the uplink packet 3 to the transmission apparatus 111 in the time division multiplexing manner through a first sideband uplink lane. The first main uplink lane includes at least one main uplink lane in the second number of main uplink lanes.

The transmission apparatus 111 is further configured to: decapsulate the uplink packet 1 to obtain the uplink audio/video signal, and send the uplink audio/video signal to the audio/video signal processing apparatus 113.

The audio/video signal processing apparatus 113 is further configured to process the uplink audio/video signal.

The transmission apparatus 111 is further configured to: decapsulate the uplink packet 2 to obtain the uplink third-party protocol signal, and send the uplink third-party protocol signal to the third-party protocol controller 116.

The third-party protocol controller 116 is further configured to process the uplink third-party protocol signal.

The transmission apparatus 111 is further configured to: decapsulate the uplink packet 3 to obtain the uplink general-purpose data, and send the uplink general-purpose data to the general-purpose data transceiver apparatus 117.

The general-purpose data transceiver apparatus 117 is further configured to process the uplink general-purpose data.

In a possible implementation, the uplink packet 1, the uplink packet 2, and the uplink packet 3 all comply with a unified transport protocol, that is, all may be decapsulated based on the unified transport protocol (for example, the first transport protocol).

According to the transmission system provided in this embodiment of the present disclosure, a full-process solution based on the unified transport protocol is provided for data transmission between the source device and the sink device. Bidirectional transmission of the audio/video signal, the general-purpose data, and the third-party protocol signal between the source device and the sink device that use the solution may be performed through the plurality of main link lanes.

It should be noted that the foregoing merely shows an example of a structure of the system 100 for performing bidirectional transmission of the audio/video signal, the general-purpose data, and third-party protocol data. However, this embodiment of the present disclosure is not limited thereto. For a structure of the system 100 for performing bidirectional transmission of the audio/video signal and the general-purpose data, and a structure for performing bidirectional transmission on the audio/video signal and the third-party protocol data, refer to a structure of a related part in FIG. 3.

It should be further noted that, the system 100 merely shows an example of a structure corresponding to bidirectional transmission of one audio/video signal, one general-purpose data signal, and one third-party protocol signal, that is, three types of signals (or data). However, this embodiment of the present disclosure is not limited thereto.

Optionally, the system 100 may include a structure corresponding to bidirectional transmission of at least one audio/video signal, at least one general-purpose data, and/or at least one third-party protocol signal. For each type of signals, a specific structure and design involved in bidirectional transmission are similar. To avoid repetition, details are not described herein again.

It should be noted that FIG. 1 to FIG. 3 merely show examples in which the system 100 includes the source device 110 and the sink device 120. However, this embodiment of the present disclosure is not limited thereto.

Optionally, the system 100 may further include at least one other source device and at least one other sink device. This is not limited in this embodiment of the present disclosure.

It should be further noted that for a connection manner and a transmission manner between any two peer devices (for example, between any source device and any sink device, between any two source devices, or between any two sink devices) in the system 100, refer to the connection manner and the transmission manner between the source device 110 and the sink device 120. To avoid repetition, details are not described herein again.

The foregoing describes the transmission system 100 provided in embodiments of the present disclosure with reference to FIG. 1 to FIG. 3. The following further describes the transmission apparatus 111 and the transmission apparatus 121 in the system 100.

Figure 4:
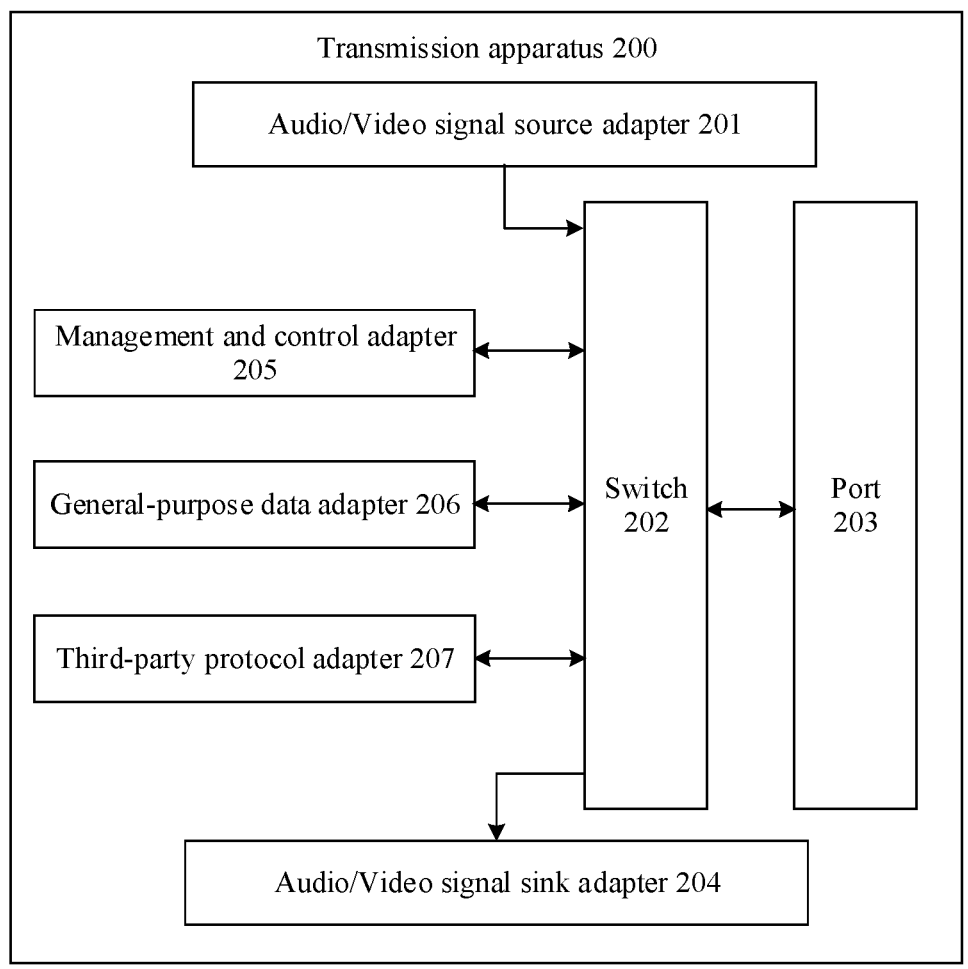
FIG. 4 is a schematic block diagram of a transmission apparatus 200 according to an embodiment of the present disclosure.

FIG. 4 is a schematic block diagram of a transmission apparatus 200 according to an embodiment of the present disclosure. The transmission apparatus 200 may be the transmission apparatus 111 or the transmission apparatus 121 in the system 100. As shown in FIG. 4, the apparatus 200 may include an audio/video signal sending adapter 201, a switch 202, a port 203, an audio/video signal receiving adapter 204, and a management and control adapter 205.

In a possible implementation, the switch 202 may include a multiplexer 202-1, a lane allocator 202-2, a demultiplexer 202-3, and a lane deallocator 202-4 that are not shown in FIG. 4.

Optionally, the apparatus 200 may further include at least one of a general-purpose data adapter 206 or a third-party protocol adapter.

It should be noted that all components included in the apparatus 200 are implemented by hardware. For specific functions of the components, refer to the following descriptions.

Figure 5A:
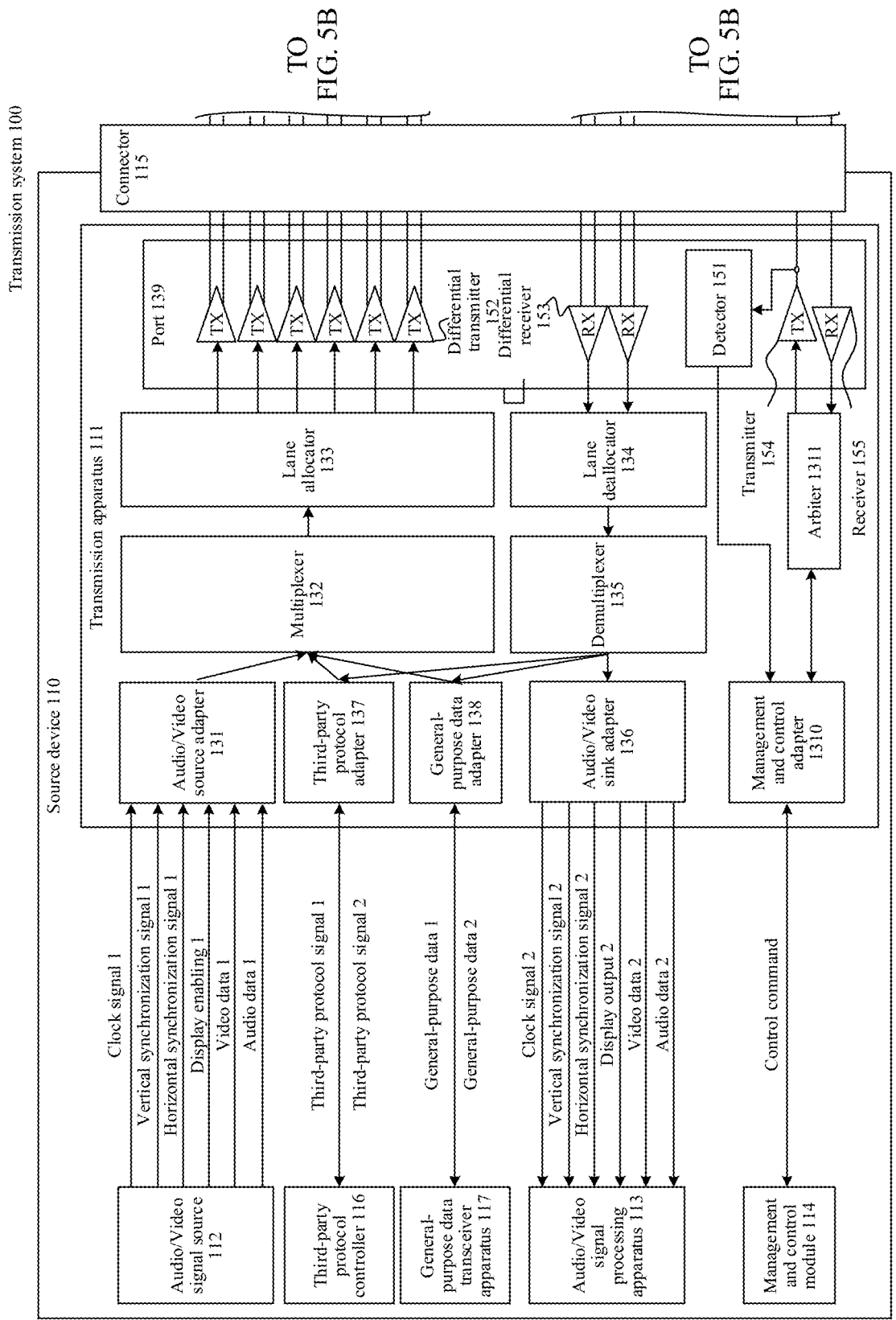
FIG. 5A and FIG. 5B are yet another schematic block diagram of a transmission system 100 according to an embodiment of the present disclosure.
Figure 5B:
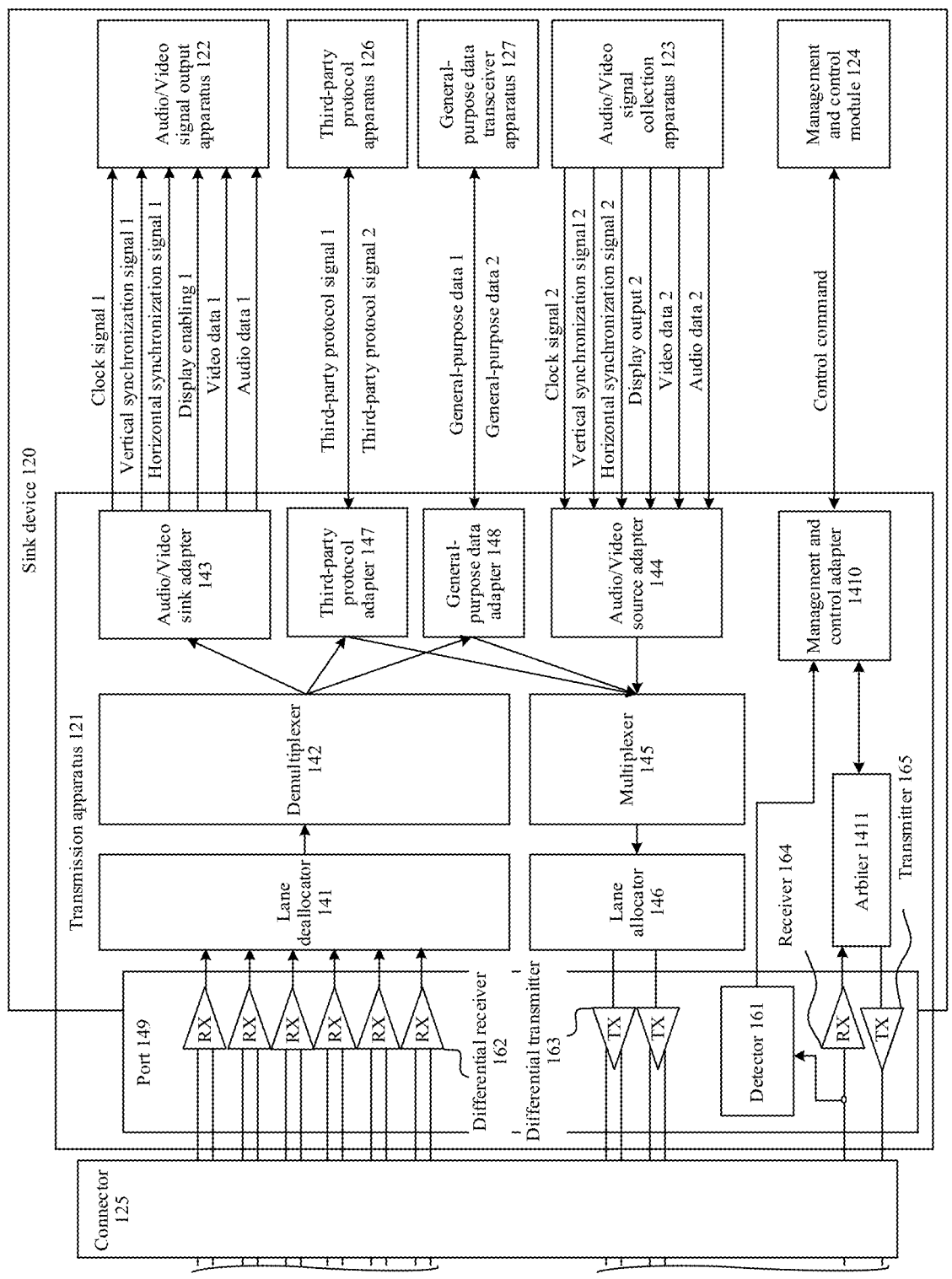

FIG. 5A and FIG. 5B are still another schematic block diagram of the transmission system 100 according to an embodiment of the present disclosure. As shown in FIG. 5A and FIG. 5B, the system 100 may include the source device 110 and the sink device 120. The source device 110 may include the transmission apparatus 111, the audio/video signal source 112, and the connector 115. The sink device 120 may include the transmission apparatus 121, the audio/video signal output apparatus 122, and the connector 125.

As shown in FIG. 5A and FIG. 5B, the transmission apparatus 111 may include an audio/video source adapter 131, a multiplexer 132, a lane allocator 133, and the port 139. The port 139 includes a first number of differential transmitters 152 (for example, six differential transmitters 152 shown in FIG. 5A). The transmission apparatus 121 may include a lane deallocator 141, a demultiplexer 142, an audio/video sink adapter 143, and a port 149. The port 149 includes a first number of differential receivers 162 (for example, six differential receivers 162 shown in FIG. 5B).

An output end of the audio/video signal source 112 is coupled to an input end of the audio/video source adapter 131, an output end of the audio/video source adapter 131 is coupled to a first input end of the multiplexer 132, an output end of the multiplexer 132 is coupled to an input end of the lane allocator 133, a first number of output ends of the lane allocator 133 are respectively coupled to input ends of the first number of differential transmitters 152, output ends of the first number of differential transmitters 152 are coupled to input ends of the first number of differential receivers 162 through a first number of downlink differential cable pairs between the connector 115 and the connector 125, output ends of the first number of differential receivers 162 are coupled to a first number of input ends of the lane deallocator 141, an output end of the lane deallocator 141 is coupled to an input end of the demultiplexer 142, a first output end of the demultiplexer 142 is coupled to an input end of the audio/video sink adapter 143, and an output end of the audio/video sink adapter 143 is coupled to an input end of the audio/video signal output apparatus 122.

The audio/video source adapter 131 is configured to: obtain a downlink audio/video signal (including a clock signal 1, a vertical synchronization signal 1, a horizontal synchronization signal 1, display output 1, video data 1, and audio data 1 shown in FIG. 5A) from the audio/video signal source 112, where the downlink audio/video signal includes a downlink video signal and/or a downlink audio signal; encapsulate the downlink audio/video signal to obtain a first downlink packet; and send the first downlink packet to the multiplexer 132.

The multiplexer 132 is configured to: pad the first downlink packet into a downlink data stream, and send a padded downlink data stream to the lane allocator 133.

It should be noted that a main downlink lane between the transmission apparatus 111 and the transmission apparatus 121 is a high-speed link lane. Once the main downlink lane is established, a downlink data stream is transmitted. In this case, the downlink data stream is formed by a plurality of null packets. When the first downlink packet needs to be transmitted, the first downlink packet is padded (or inserted) into the downlink data stream and a corresponding null packet is replaced, and a padded (or inserted) downlink data stream is further transmitted.

In other words, the multiplexer 132 is configured to multiplex the first downlink packet and the null packet into the downlink data stream, so that a rate of the downlink data stream matches an actual rate of the first number of downlink differential cable pairs.

For example, when an actual transmission rate of the first number of downlink differential cable pairs is 12 Gbps, and the rate of the first downlink packet is 8 Gbps. To ensure that the rate of the downlink data stream obtained through multiplexing adapts to the actual transmission rate of the first number of downlink differential cable pairs, the multiplexer 132 needs to generate a null packet of 4 Gbps and pad the null packet into the downlink data stream, so that a rate of a padded downlink data stream matches the actual transmission rate of the first number of downlink differential cable pairs.

The lane allocator 133 is configured to: allocate the downlink data stream to a first main downlink lane, and send the downlink data stream to the lane deallocator 141. The first main downlink lane includes at least one main downlink lane in a downlink lane group.

In other words, the lane allocator 133 may allocate, based on a data amount of the downlink data stream or another transmission status, the downlink data stream to some or all main downlink lanes in the first number of downlink differential cable pairs included in the port 139.

The lane deallocator 141 is configured to: combine downlink sub-data streams received through the first main downlink lane into the downlink data stream, and send the downlink data stream to the demultiplexer 142.

The demultiplexer 142 is configured to: extract the first downlink packet from the downlink data stream, and send the first downlink packet to the audio/video sink adapter 143.

A function of the demultiplexer 142 is an inverse process of a function of the multiplexer 132, to be specific, the first downlink packet padded into the downlink data stream is extracted.

The audio/video sink adapter 143 is configured to: decapsulate the first downlink packet to obtain the downlink audio/video signal, and send the downlink audio/video signal to the audio/video signal output apparatus 122.

The audio/video signal output apparatus 122 is configured to output the downlink audio/video signal.

Further, the source device 110 may further include the audio/video signal processing apparatus 113, the transmission apparatus 111 may further include a lane deallocator 134, a demultiplexer 135, and an audio/video sink adapter 136, and the port 139 may further include a second number of differential receivers 153 (for example, two differential receivers 153 shown in FIG. 5A). The sink device 120 may further include the audio/video signal collection apparatus 123, the transmission apparatus 121 may further include an audio/video source adapter 144, a multiplexer 145, and a lane allocator 146, and the port 149 may further include a second number of differential transmitters 163 (for example, two differential transmitters 163 shown in FIG. 5B).

An output end of the audio/video signal collection apparatus 123 is coupled to an input end of the audio/video source adapter 144, an output end of the audio/video source adapter 144 is coupled to an input end of the multiplexer 145, an output end of the multiplexer 145 is coupled to an input end of the lane allocator 146, a second number of output ends of the lane allocator 146 are respectively coupled to input ends of the second number of differential transmitters 163, output ends of the second number of differential transmitters 163 are coupled to input ends of the second number of differential receivers 153 through the second number of uplink differential cable pairs between the connector 125 and the connector 115, output ends of the second number of differential receivers 153 are coupled to an input end of the lane deallocator 134, an output end of the lane deallocator 134 is coupled to an input end of the demultiplexer 135, an output end of the demultiplexer 135 is coupled to an input end of the audio/video sink adapter 136, and an output end of the audio/video sink adapter 136 is coupled to an input end of the audio/video signal processing apparatus 113.

The audio/video source adapter 144 is configured to: obtain an uplink audio/video signal (including a clock signal 2, a vertical synchronization signal 2, a horizontal synchronization signal 2, display output 2, video data 2, and audio data 2 shown in FIG. 5B) from the audio/video signal collection apparatus 123, where the uplink audio/video signal includes an uplink video signal and/or an uplink audio signal; encapsulate the uplink audio/video signal to obtain a first uplink packet; and send the first uplink packet to the multiplexer 145.

The multiplexer 145 is configured to: pad the first uplink packet into an uplink data stream, and send a padded uplink data stream to the lane allocator 146.

It should be noted that a main uplink lane between the transmission apparatus 111 and the transmission apparatus 121 is a high-speed link lane. Once the main uplink lane is established, an uplink data stream is transmitted. In this case, the uplink data stream is formed by a plurality of null packets. When the first uplink packet needs to be transmitted, the first uplink packet is padded (or inserted) into the uplink data stream and a corresponding null packet is replaced, and a padded (or inserted) uplink data stream is further transmitted.

In other words, the multiplexer 145 is configured to multiplex the first uplink packet and the null packet into the uplink data stream, so that a rate of the uplink data stream matches an actual rate of the second number of uplink differential cable pairs.

The lane allocator 146 is configured to: allocate the uplink data stream to a first main uplink lane, and send the uplink data stream to the lane deallocator 134. The first main uplink lane includes at least one main uplink lane in the second number of main uplinks.

The lane deallocator 134 is configured to: combine uplink sub-data streams received through the first main uplink lane into the uplink data stream, and send the uplink data stream to the demultiplexer 135.

The demultiplexer 135 is configured to: demultiplex the uplink data stream into the first uplink packet, and send the first uplink packet to the audio/video sink adapter 136.

A function of the demultiplexer 135 is an inverse process of a function of the multiplexer 145, to be specific, the first uplink packet padded into the uplink data stream is extracted.

The audio/video sink adapter 136 is configured to: decapsulate the first uplink packet to obtain the uplink audio/video signal, and send the uplink audio/video signal to the audio/video signal processing apparatus 113.

The audio/video signal processing apparatus 113 is configured to further process the uplink audio/video signal.

In a possible implementation, the source device 110 may further include the third-party protocol controller 116, the transmission apparatus 111 may further include a third-party protocol adapter 137, the sink device may further include the third-party protocol apparatus 126, and the transmission apparatus 121 may further include a third-party protocol adapter 147.

An output end of the third-party protocol controller 116 is coupled to an input end of the third-party protocol adapter 137, and an output end of the third-party protocol adapter 137 is coupled to a second input end of the multiplexer 132. A second output end of the demultiplexer 142 is coupled to an input end of the third-party protocol adapter 147, and an output end of the third-party protocol adapter 147 is coupled to an input end of the third-party signal transceiver apparatus 126.

The third-party protocol adapter 137 is configured to: obtain a downlink third-party protocol signal (a third-party protocol signal 1 shown in FIG. 5A) from the third-party protocol controller 116, encapsulate the downlink third-party protocol signal to obtain a second downlink packet, and send the second downlink packet to the multiplexer 132.

The multiplexer 132 is specifically configured to multiplex the first downlink packet and the second downlink packet into the downlink data stream.

The demultiplexer 142 is specifically configured to demultiplex the first downlink packet and the second downlink packet from the downlink data stream.

The demultiplexer 142 is further configured to send the second downlink packet to the third-party protocol adapter 147.

The third-party protocol adapter 147 is configured to: decapsulate the second downlink packet to obtain the downlink third-party protocol signal, and send the downlink third-party protocol signal to the third-party protocol apparatus 126.

The third-party protocol apparatus 126 is configured to further process the downlink third-party protocol signal.

The third-party protocol adapter 147 is further configured to: obtain an uplink third-party protocol signal (a third-party protocol signal 2 shown in FIG. 5B) from the third-party protocol apparatus 126, encapsulate the uplink third-party protocol signal to obtain a second uplink packet, and send the second uplink packet to the multiplexer 145.

The multiplexer 145 is specifically configured to multiplex the first uplink packet and the second uplink packet into the uplink data stream.

The demultiplexer 135 is specifically configured to demultiplex the first uplink packet and the second uplink packet from the uplink data stream.

The demultiplexer 135 is further configured to send the second uplink packet to the third-party protocol adapter 137.

The third-party protocol adapter 137 is further configured to: decapsulate the second uplink packet to obtain the uplink third-party protocol signal, and send the uplink third-party protocol signal to the third-party protocol controller 116.

The third-party protocol controller 116 is further configured to further process the uplink third-party protocol signal.

In a possible implementation, when the third-party protocol is a USB protocol, the third-party protocol controller 116 may be a USB controller, the downlink third-party protocol signal is a USB protocol signal, and the third-party protocol apparatus 126 is a USB apparatus.

In another possible implementation, when the third-party protocol is a PCIe protocol, the third-party protocol controller 116 may be a PCIe controller, the downlink third-party protocol signal is a PCIe protocol signal, and the third-party protocol apparatus 126 is a PCIe apparatus.

In a possible implementation, the encapsulation and the decapsulation in this embodiment of the present disclosure are performed based on a unified transport protocol, for example, a first transport protocol.

In another possible implementation, the source device 110 may further include the general-purpose data transceiver apparatus 117, the transmission apparatus 111 may further include a general-purpose data adapter 138, the sink device 120 may further include the general-purpose data transceiver apparatus 127, and the transmission apparatus 121 further includes a general-purpose data adapter 148.

An output end of the general-purpose data transceiver apparatus 117 is coupled to an input end of the general-purpose data adapter 138, and an output end of the general-purpose data adapter 138 is coupled to a third input end of the multiplexer 132. A third output end of the demultiplexer 142 is coupled to an input end of the general-purpose data adapter 148, and an output end of the general-purpose data adapter 148 is coupled to an input end of the general-purpose data transceiver apparatus 127.

The general-purpose data adapter 138 is configured to: obtain downlink general-purpose data (general-purpose data 1 shown in FIG. 5A) from the general-purpose data transceiver apparatus 117, encapsulate the downlink general-purpose data to obtain a third downlink packet, and send the third downlink packet to the multiplexer 132.

The multiplexer 132 is specifically configured to multiplex the first downlink packet and the third downlink packet into the downlink data stream.

The demultiplexer is 142 specifically configured to demultiplex the first downlink packet and the third downlink packet from the downlink data stream.

The demultiplexer 142 is further configured to send the third downlink packet to the general-purpose data adapter 148.

The general-purpose data adapter 148 is further configured to: decapsulate the third downlink packet to obtain the downlink general-purpose data, and send the downlink general-purpose data to the general-purpose data transceiver apparatus 127.

The general-purpose data transceiver apparatus 127 is configured to further process the downlink general-purpose data.

The general-purpose data adapter 148 is further configured to: obtain uplink general-purpose data (general-purpose data 2 shown in FIG. 5B) from the general-purpose data transceiver apparatus 127, encapsulate the uplink general-purpose data to obtain a third uplink packet, and send the third uplink packet to the multiplexer 142.

The multiplexer 142 is specifically configured to multiplex the first uplink packet and the third uplink packet into the uplink data stream.

The demultiplexer 135 is specifically configured to demultiplex the first uplink packet and the third uplink packet from the uplink data stream.

The demultiplexer 135 is further configured to send the third uplink packet to the general-purpose data adapter 138.

The general-purpose data adapter 138 is further configured to: decapsulate the third uplink packet to obtain the uplink general-purpose data, and send the uplink general-purpose data to the general-purpose data transceiver apparatus 117.

The general-purpose data transceiver apparatus 117 is further configured to further process the uplink general-purpose data.

In still another possible implementation, the source device 110 may further include the third-party protocol controller 116 and the general-purpose data transceiver apparatus 117, the transmission apparatus 111 may further include the third-party protocol adapter 137 and the general-purpose data adapter 138, the sink device may further include the third-party protocol apparatus 126 and the general-purpose data transceiver apparatus 127, and the transmission apparatus 121 may further include the third-party protocol adapter 147 and the general-purpose data adapter 148. The system 100 may perform bidirectional transmission of an audio/video signal, general-purpose data, and a third-party protocol signal. For details, refer to a bidirectional transmission process of the audio/video signal and the general-purpose data and a bidirectional transmission process of the audio/video signal and the third-party protocol signal.

In a possible implementation, the source device 110 may further include the management and control module 114, the transmission apparatus 111 may further include a management and control adapter 1310 and an arbiter 1311, and the port 139 may further include a transmitter 154 and a receiver 155. The sink device 120 may further include the management and control module 124, the transmission apparatus 121 may further include a management and control adapter 1410 and an arbiter 1411, and the port 149 may further include a transmitter 164 and a receiver 165.

A first end of the management and control module 114 is coupled to a first end of the management and control adapter 1310, a second end of the management and control adapter 1310 is coupled to a first end of the arbiter 1311, a second end of the arbiter 1311 is coupled to an input end of the transmitter 154, a third end of the arbiter 1311 is coupled to an output end of the receiver 155, a first end of the management and control module 124 is coupled to a first end of the management and control adapter 1410, a second end of the management and control adapter 1410 is coupled to a first end of the arbiter 1411, a second end of the arbiter 1411 is coupled to an output end of the receiver 164, a third end of the arbiter 1411 is coupled to an input end of the transmitter 165, and an output end of the transmitter 154 is coupled to an input end of the receiver 164 through a downlink sideband between the connector 115 and the connector 125. The downlink sideband is configured to transmit a downlink control command sent by the management and control adapter 1310 to the management and control adapter 1410. The transmitter 165 is coupled to the receiver 155 through an uplink sideband between the connector 115 and the connector 125. The uplink sideband is used to transmit an uplink control command sent by the management and control adapter 1410 to the management and control adapter 1310.

The management and control adapter 1310 and the management and control adapter 1410 are configured to implement, through the downlink sideband and the uplink sideband, at least one of the following functions: plug detection, flip identification, high-speed transmission link training information exchange, device capability information obtaining, device status information obtaining, discovery and establishment of a network topology structure, content protection information exchange, and device interoperation.

It should be noted that for functions of the management and control adapter 1310 and the management and control adapter 1410, refer to related descriptions in FIG. 4. Details are not described herein again.

Optionally, the port 139 may further include a detector 151. The detector 151 is configured to: detect that the port 139 is connected to/disconnected from the port 149 and/or whether the cable is reversely connected between the connector 115 and the connector 125, and feed back a detection result 1 to the management and control adapter 1310.

The management and control adapter 1310 is configured to: receive the detection result 1 from the detector 151, generate a control command a (or data a or a signal a) based on the detection result 1, and send the control command a (or the signal a or the data a) to the management and control module 114 on an application layer for further processing.

The management and control adapter 1310 is further configured to: receive a control command b (or a signal b or data b) from the management and control module 114, and configure and manage the entire transmission apparatus 111 based on the control command b (or the signal b or the data b).

The management and control adapter 1310 is further configured to: receive a control command c (or a signal c or data c) from the transmission apparatus 121 through the uplink sideband, and configure and manage the entire transmission apparatus 111 based on the control command c (or the signal c or the data c).

The management and control adapter 1310 is further configured to: receive a control command d (or a signal d or data d) from another device, and send the control command d (or the signal d or the data d) to the transmission apparatus 121 through the downlink sideband.

Optionally, the port 149 may further include a detector 161. The detector 161 is configured to: detect that the port 139 is connected to/disconnected from the port 149, and feed back a detection result 2 to the management and control adapter 1410.

The management and control adapter 1410 is configured to: receive the detection result 2 from the detector 161, generate a control command e (or data e or a signal e) based on the detection result 2, and send the control command e (or the signal e or the data e) to the management and control module 124 on the application layer for further processing.

The management and control adapter 1410 is further configured to: receive a control command f (or a signal f or data f) from the management and control module 124, and configure and manage the entire transmission apparatus 121 based on the control command f (or the signal f or the data f).

The management and control adapter 1410 is further configured to: receive the control command c (or the signal c or the data c) from the transmission apparatus 111 through the downlink sideband, and configure and manage the entire transmission apparatus 121 based on the control command c (or the signal c or the data c).

The management and control adapter 1310 is further configured to: receive the control command b (or the signal b or the data b) from another device, and send the control command b (or the signal b or the data b) to the transmission apparatus 111 through the downlink sideband.

It should be further noted that the foregoing system 100 is described by using only an example in which the source device is directly connected to the sink device. However, this is not limited in this embodiment of the present disclosure.

Optionally, the source device and the sink device may be further connected to each other by using a routing network.

Figure 6:
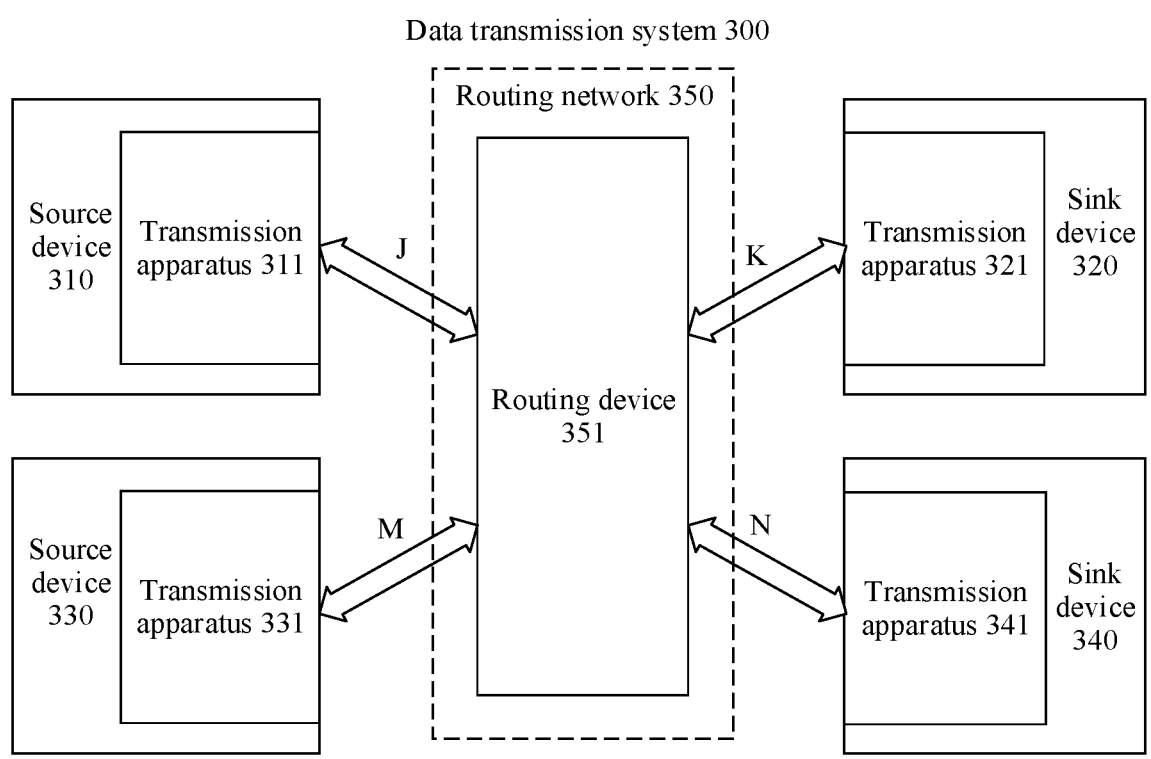
FIG. 6 is a schematic block diagram of a transmission system 300 according to an embodiment of the present disclosure.

In a possible implementation, FIG. 6 is a schematic block diagram of a transmission system 300 according to an embodiment of the present disclosure. As shown in FIG. 6, the system 300 may include at least one source device (a source device 310 and a source device 330 shown in FIG. 6), at least one sink device (a sink device 320 and a sink device 340 shown in FIG. 6), and a routing network 350. The routing network 350 is configured to route and forward an audio/video signal, general-purpose data, and/or a third-party protocol signal transmitted between different peer devices.

In FIG. 6, the source device 310 may include a transmission apparatus 311, the sink device 320 may include a transmission apparatus 321, the source device 330 may include a transmission apparatus 331, and the sink device 340 may include a transmission apparatus 341. The routing network 350 includes a routing device 351.

In a possible implementation, bidirectional transmission of the audio/video signal, the general-purpose data, and/or the third-party protocol signal between the transmission apparatus 311 and the transmission apparatus 321 may be performed through forwarding of the routing device 351 and through a cable J between the transmission apparatus 311 and the routing device 351 and a cable K between the routing device 351 and the transmission apparatus 321.

It should be noted that the cable J may include a plurality of main link lanes J and secondary main link lanes J, and the cable K may include a plurality of main link lanes K and secondary main link lanes K.

Optionally, composition of the plurality of main link lanes J may be the same as or different from composition of the plurality of main link lanes K. This is not limited in this embodiment of the present disclosure.

In a possible implementation, bidirectional transmission of the audio/video signal, the general-purpose data, and/or the third-party protocol signal between the transmission apparatus 311 and the transmission apparatus 341 may be performed through forwarding of the routing device 351 and through a cable J between the transmission apparatus 311 and the routing device 351 and a cable N between the routing device 351 and the transmission apparatus 341.

It should be noted that the cable N may include a plurality of main link lanes N and secondary main link lanes N.

Optionally, composition of the plurality of main link lanes J may be the same as or different from composition of the plurality of main link lanes N. This is not limited in this embodiment of the present disclosure.

In a possible implementation, bidirectional transmission of the audio/video signal, the general-purpose data, and/or the third-party protocol signal between the transmission apparatus 331 and the transmission apparatus 321 may be performed through forwarding of the routing device 351 and through a cable M between the transmission apparatus 331 and the routing device 351 and a cable K between the routing device 351 and the transmission apparatus 321.

It should be noted that the cable M may include a plurality of main link lanes M and secondary main link lanes M.

Optionally, composition of the plurality of main link lanes M may be the same as or different from composition of the plurality of main link lanes K. This is not limited in this embodiment of the present disclosure.

It should be noted that, for composition of a cable between devices and a bidirectional transmission process of a data stream in FIG. 6, refer to the composition of the cable between the source device and the peer device and the bidirectional transmission process of the data stream in FIG. 1 to FIG. 3. Details are not described herein again.

It should be further noted that, for a part that is not described in FIG. 6, refer to corresponding descriptions in FIG. 1 to FIG. 5B.

It should be further noted that in FIG. 6, only two source devices and two sink devices are used as an example for description. However, this embodiment of the present disclosure is not limited thereto. The system 300 may include at least one source device and at least one sink device.

In the existing transmission system, a source device, a branch device (or a switching device), and a sink device form a "tree-shaped" network topology structure. For example, one source device and a plurality of sink devices form a "tree-shaped" network topology structure by using the branch device/switching device, so that unidirectional or bidirectional transmission of a data stream may be implemented between the source device and the plurality of sink devices by using the branch device/switching device. For another example, a plurality of source devices and one sink device may form a "tree-shaped" network topology structure by using the branch device/switching device, so that unidirectional or bidirectional transmission of a data stream may be implemented between the sink device and the plurality of source devices by using the branch device/switching device.

However, in the transmission system 300 provided in this embodiment of the present disclosure, a plurality of source devices and a plurality of sink devices may form a "mesh-shaped" network topology structure by using the routing network, so that bidirectional transmission of the audio/video signal may be implemented between any two peer devices through routing and forwarding of the routing network, and further, bidirectional transmission of the audio/video signal, the general-purpose data, and/or the third-party protocol signal may be implemented. This can expand an application scenario of the system 100.

Figure 7:
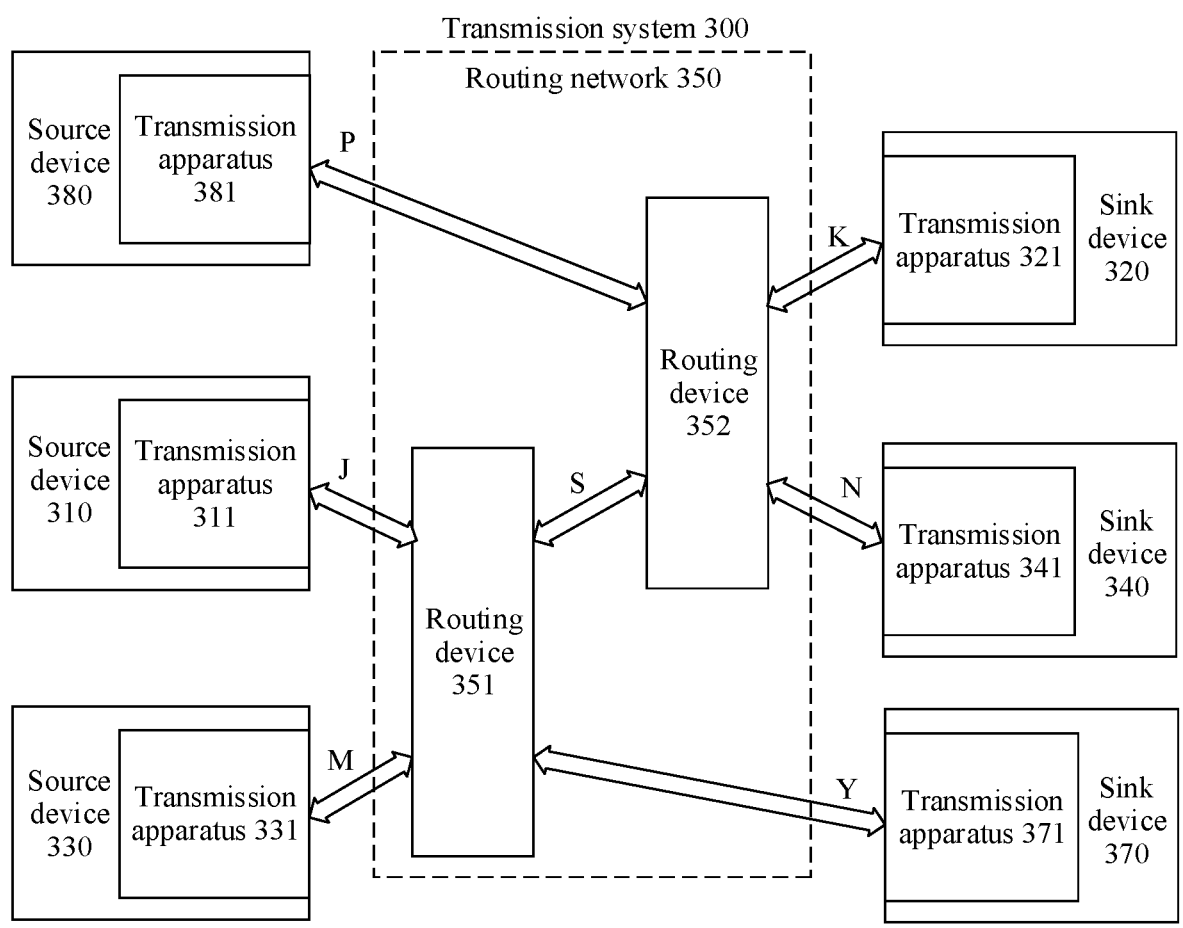
FIG. 7 is another schematic block diagram of a transmission system 300 according to an embodiment of the present disclosure.

In another possible implementation, FIG. 7 is another schematic block diagram of the transmission system 300 according to an embodiment of the present disclosure. As shown in FIG. 7, the system 300 may include at least one source device (the source device 310, the source device 330, and a source device 380 shown in FIG. 7), at least one sink device (the sink device 320, the sink device 340, and a sink device 370 shown in FIG. 7), and the routing network 350. The routing network 350 is configured to route and forward an audio/video signal, general-purpose data, and/or a third-party protocol signal transmitted between different peer devices.

In FIG. 7, the source device 310 may include the transmission apparatus 311, the sink device 320 may include the transmission apparatus 321, the source device 330 may include the transmission apparatus 331, the sink device 340 may include the transmission apparatus 341, the sink device 370 may include a transmission apparatus 371, and the source device 380 may include a transmission apparatus 381. The routing network 350 includes the routing device 351 and a routing device 352.

It should be noted that the routing device 351 and the routing device 352 form a two-level cascaded routing network, and jointly complete routing and forwarding of the audio/video signal, the general-purpose data, and/or the third-party protocol signal transmitted between different peer devices.

It should be further noted that FIG. 7 merely shows an example of a possible cascading manner of the routing device 351 and the routing device 352. To be specific, the routing device 351 is connected to the routing device 352 through a cable S shown in FIG. 7. However, this embodiment of the present disclosure is not limited thereto. The routing network 350 may further include another number of routing devices, and the routing devices are connected in another different cascading manner. This is not limited in this embodiment of the present disclosure.

In a possible implementation, bidirectional transmission of the audio/video signal, the general-purpose data, and/or the third-party protocol signal between the transmission apparatus 311 and the transmission apparatus 381 may be performed through forwarding of the routing network 350 and through a cable M between the transmission apparatus 311 and the routing network 350 and a cable P between the routing network 350 and the transmission apparatus 381.

In a possible implementation, bidirectional transmission of the audio/video signal, the general-purpose data, and/or the third-party protocol signal between the transmission apparatus 381 and the transmission apparatus 341 may be performed through forwarding of the routing network 350 and through a cable P between the transmission apparatus 381 and the routing network 350 and a cable N between the routing network 350 and the transmission apparatus 341.

In a possible implementation, bidirectional transmission of the audio/video signal, the general-purpose data, and/or the third-party protocol signal between the transmission apparatus 311 and the transmission apparatus 321 may be performed through forwarding of the routing network 350 and through a cable J between the transmission apparatus 311 and the routing network 350 and a cable K between the routing network 350 and the transmission apparatus 321.

It should be noted that, for composition of each cable and a bidirectional transmission process of a data stream in FIG. 7, refer to composition of the cable between the source device and the peer device and the bidirectional transmission process of the data stream in FIG. 1 to FIG. 3. Details are not described herein again.

It should be noted that, for a part that is not described in FIG. 7, refer to corresponding descriptions in FIG. 1 to FIG. 5B.

It should be further noted that in FIG. 7, only three source devices and three sink devices are used as an example for description. However, this embodiment of the present disclosure is not limited thereto. The system 300 may include at least one source device and at least one sink device.

In the transmission system 300 provided in this embodiment of the present disclosure, source devices and sink devices establish a "mesh-shaped" network topology structure by using a plurality of levels of routing devices, to increase a transmission distance.

The foregoing describes the transmission system 300 provided in embodiments of the present disclosure with reference to FIG. 6 and FIG. 7. The following describes a routing apparatus provided in embodiments of the present disclosure.

Figure 8:
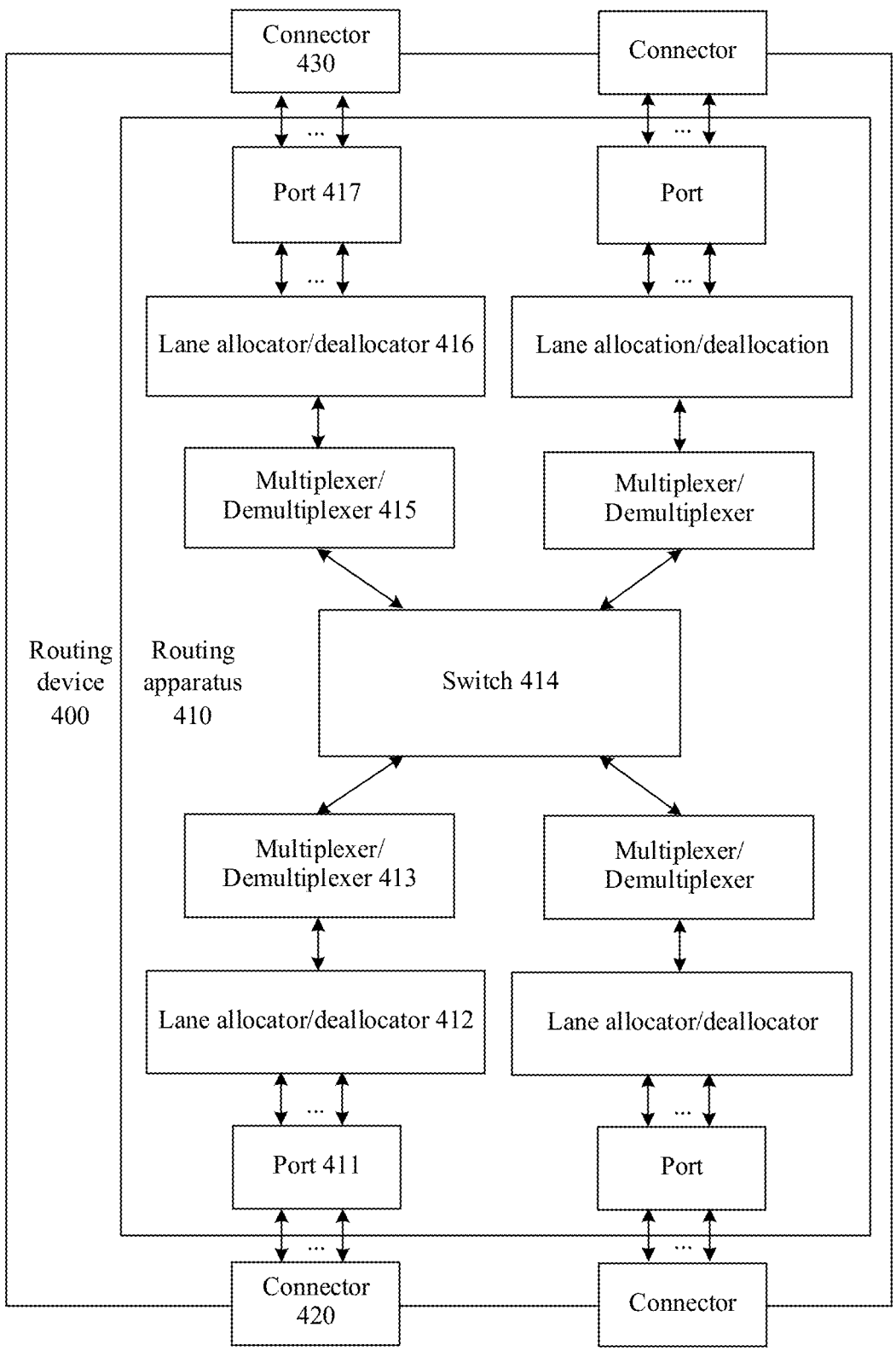
FIG. 8 is a schematic block diagram of a routing device 400 according to an embodiment of the present disclosure.

FIG. 8 is a schematic block diagram of a routing device 400 according to an embodiment of the present disclosure. The routing device 400 may be the routing device 351 or the routing device 352 in the system 300. As shown in FIG. 8, the device 400 may include a routing apparatus 410 and a plurality of connectors (for example, a connector 420 and a connector 430 shown in FIG. 8). The routing apparatus 410 may include a port 411, a lane allocator/deallocator 412, a multiplexer/demultiplexer 413, a switch 414, a multiplexer/demultiplexer 415, a lane allocator/deallocator 416, and a port 417. The port 411 is connected to a first apparatus by using the connector 420, and the port 417 is connected to a second apparatus by using the connector 430.

Optionally, the first apparatus may be integrated into a peer device or a routing device (or may be a peer device or a routing device). Similarly, the second apparatus may be integrated into a peer device or a routing device (or may be a peer device or a routing device). This is not limited in this embodiment of the present disclosure.

In a possible implementation, as shown in FIG. 6, when the device 400 is the routing device 351, the first apparatus may be the transmission apparatus 311, and the second apparatus may be the transmission apparatus 341 in the system 300.

In another possible implementation, as shown in FIG. 7, when the device 400 is the routing device 351, the first apparatus may be the transmission apparatus 311, and the second apparatus may be integrated into the routing device 352 in the system 300.

It should be noted that, for a connection manner between the device 400 and the first apparatus and a connection manner between the device 400 and the second apparatus, refer to a connection manner between the transmission apparatus 111 and the transmission apparatus 121 in the system 100. For functions of all components in a process of bidirectional transmission of an audio/video signal, general-purpose data, and/or a third-party protocol signal between the device 400 and the first apparatus and between the device 400 and the second apparatus, refer to functions of all components in the transmission apparatus 111 and the transmission apparatus 121 described in FIG. 5A and FIG. 5B.

In addition, the switch 414 is configured to forward a received uplink data stream (or downlink data stream) through a port corresponding to a destination of the uplink data stream (or downlink data stream).

It should be noted that FIG. 8 merely shows an example of a structure of the routing apparatus 410 when the device 400 includes four connectors. However, this embodiment of the present disclosure is not limited thereto.

Optionally, in this embodiment of the present disclosure, a manner in which the switch 414 routes and forwards the audio/video signal, the general-purpose data, and/or the third-party protocol signal between the ports is not limited. For example, refer to an existing routing and forwarding manner.

The foregoing describes the routing device provided in embodiments of the present disclosure with reference to FIG. 8. The following describes a transmission method provided in embodiments of the present disclosure.

Figure 9A:
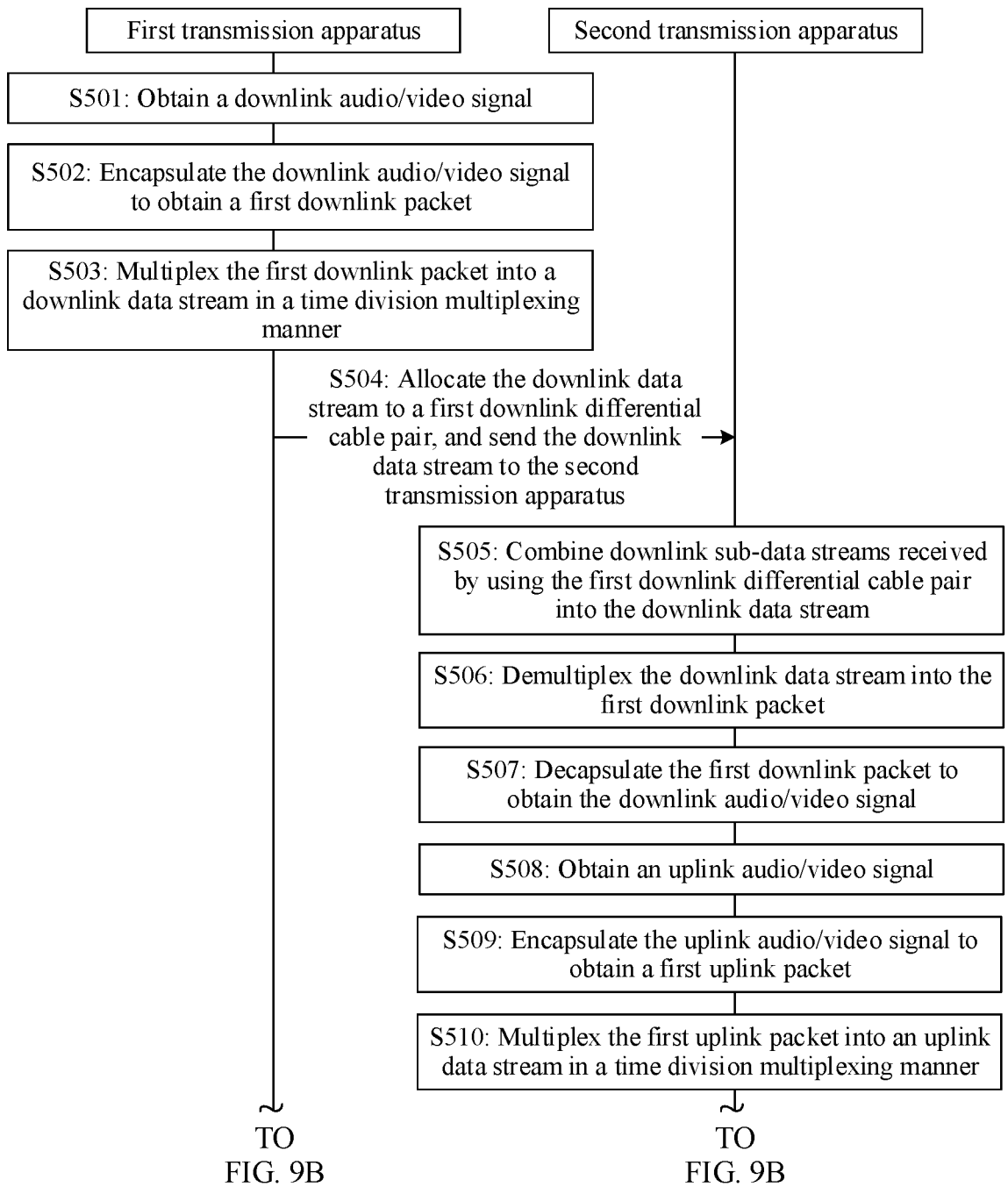
FIG. 9A and FIG. 9B are a schematic flowchart of a transmission method 500 according to an embodiment of the present disclosure.
Figure 9B:
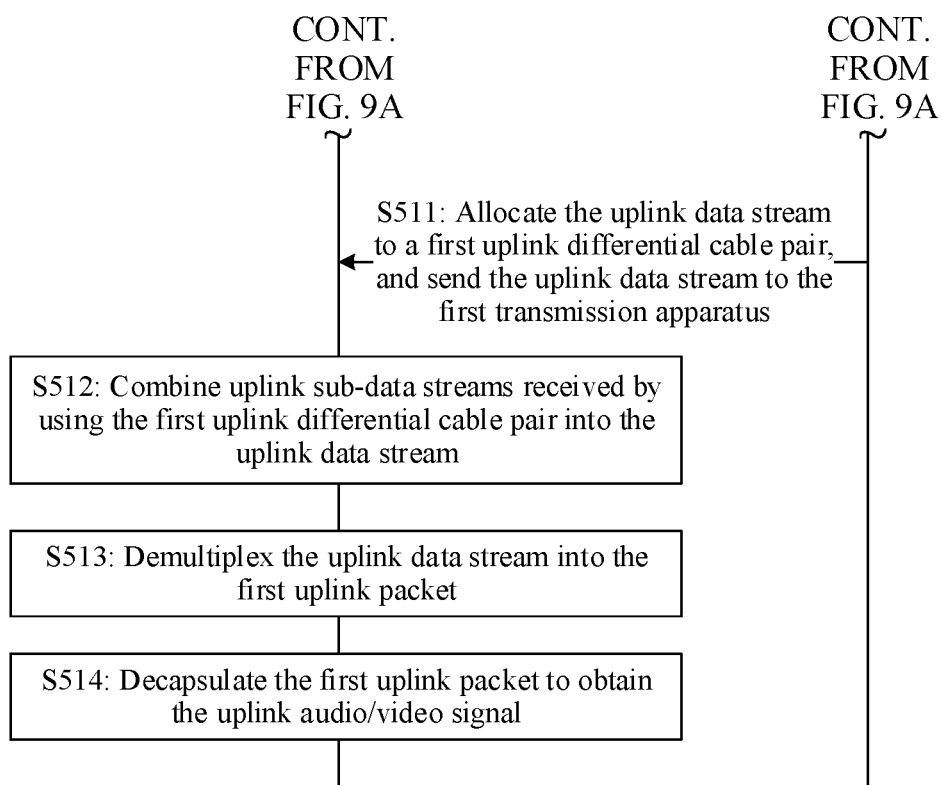

FIG. 9A and FIG. 9B are a schematic flowchart of a transmission method 500 according to an embodiment of the present disclosure. The method 500 may be applied to the foregoing system 100.

It should be noted that, as shown in FIG. 9A and FIG. 9B, the method 500 may include S501 to S514. S501 to S507 are a downlink transmission process, and S508 to S514 are an uplink transmission process. The two processes are independent of each other, and are not subject to a specific sequence.

1. Downlink Transmission Process

S501: A first transmission apparatus obtains a downlink audio/video signal. The downlink audio/video signal includes a downlink video signal and/or a downlink audio signal.

It should be noted that the first transmission apparatus may be the transmission apparatus 111 in the system 100.

In a possible implementation, the first transmission apparatus may receive the downlink audio/video signal from an audio/video signal source.

S502: The first transmission apparatus encapsulates the downlink audio/video signal to obtain a first downlink packet.

S503: The first transmission apparatus pads the first downlink packet into a downlink data stream.

S504: The first transmission apparatus allocates the downlink data stream to a first main downlink lane, and sends the downlink data stream to a second transmission apparatus. The first transmission apparatus is connected to the second transmission apparatus through a first cable. The first cable includes a first number of main downlink lanes. The first main downlink lane includes at least one main downlink lane in the first number of main downlink lanes. Correspondingly, the second transmission apparatus receives a downlink sub-data stream from the first transmission apparatus through the first main downlink lane.

It should be noted that the second transmission apparatus may be the transmission apparatus 121 in the system 100.

S505: The second transmission apparatus combines the downlink sub-data streams received through the first main downlink lane into the downlink data stream.

S506: The second transmission apparatus extracts the first downlink packet from the downlink data stream.

S507: The second transmission apparatus decapsulates the first downlink packet to obtain the downlink audio/video signal.

2. Uplink Transmission Process

S508: The second transmission apparatus obtains an uplink audio/video signal. The uplink audio/video signal includes an uplink video signal and/or an uplink audio signal.

In a possible implementation, the second transmission apparatus may receive the uplink audio/video signal from an audio/video signal collection apparatus.

S509: The second transmission apparatus encapsulates the uplink audio/video signal to obtain a first uplink packet.

S510: The second transmission apparatus pads the first uplink packet into an uplink data stream.

S511: The second transmission apparatus allocates the uplink data stream to a first main uplink lane, and sends the uplink data stream to the first transmission apparatus. The first cable further includes a second number of main uplink lanes. The first main uplink lane includes at least one main uplink lane in the second number of main uplink lanes. Correspondingly, the first transmission apparatus receives an uplink sub-data stream from the second transmission apparatus through the first main uplink lane.

S512: The first transmission apparatus combines the uplink sub-data streams received through the first main uplink lane into the uplink data stream.

S513: The first transmission apparatus extracts the first uplink packet from the uplink data stream.

S514: The first transmission apparatus decapsulates the first uplink packet to obtain the uplink audio/video signal.

Optionally, the first cable may further include a sideband pair, and the sideband pair includes a downlink sideband and an uplink sideband. The first transmission apparatus and the second transmission apparatus may implement, through the sideband pair, at least one of the following auxiliary functions: (1) plug detection, (2) flip identification, (3) high-speed transmission link training information exchange, (4) device capability information obtaining, (5) device status information obtaining, (6) discover and establishment of a network topology structure, (7) content protection information exchange, and (8) device interoperation.

The following provides descriptions by using a process in which the first transmission apparatus implements the foregoing auxiliary functions through the sideband pair as an example. For a process in which the second transmission apparatus implements the foregoing auxiliary functions through the sideband pair, refer to the first transmission apparatus.

In a possible implementation, for the auxiliary function (1), before S504, the first transmission apparatus may detect a plug status of the first cable in the second transmission apparatus, where the plug status includes insertion or removal. After it is detected that the first cable is inserted into the second transmission apparatus, and the second transmission apparatus is powered on and completes link establishment, S504 is performed.

In a possible implementation, for the auxiliary function (2), before S504, the first transmission apparatus may detect an insertion direction of the first cable in the second transmission apparatus, where the insertion direction includes forward insertion or reverse insertion; and determine the main downlink lane from a plurality of main link lanes based on the insertion direction in the second transmission apparatus.

In a possible implementation, for the auxiliary function (3), before S504, the first transmission apparatus may send training data to the second transmission apparatus through the first number of main downlink lanes at a first transmission rate. The first transmission apparatus receives high-speed training information from the second transmission apparatus through the uplink sideband, where the high-speed training information indicates to increase or decrease the first transmission rate. The first transmission apparatus adjusts the first transmission rate to a second transmission rate based on the high-speed training information.

Correspondingly, the second transmission apparatus receives the training data from the first transmission apparatus through the first number of main downlink lanes at the first transmission rate. The second transmission apparatus determines the high-speed training information based on a receiving status of the training data. The second transmission apparatus sends the high-speed training information to the first transmission apparatus through the uplink sideband.

Further, S504 may include: The first transmission apparatus allocates the downlink data stream to the first main downlink lane, and sends the downlink data stream to the second transmission apparatus at the second transmission rate.

In a possible implementation, for the auxiliary function (4), before S504, the first transmission apparatus may send a device capability request to the second transmission apparatus through the downlink sideband, where the device capability request is used to request the second transmission apparatus to report at least one of a bidirectional transmission capability, a video capability, an audio capability, and an enhanced video capability. The first transmission apparatus receives device capability information from the second transmission apparatus through the uplink sideband, where the device capability information indicates at least one of the bidirectional transmission capability, the video capability, the audio capability, and the enhanced video capability of the second transmission apparatus.

Correspondingly, the second transmission apparatus receives the device capability request from the first transmission apparatus through the downlink sideband. The second transmission apparatus sends, based on the device capability request, the device capability information to the first transmission apparatus through the uplink sideband.

Further, S504 may include: The first transmission apparatus allocates the downlink data stream to the first main downlink lane based on the device capability information, and sends the downlink data stream to the second transmission apparatus.

Optionally, the bidirectional transmission capability may include a bidirectional transmission capability for an audio/video signal, general-purpose data, and/or a third-party protocol signal. The video capability may include a resolution, a frame rate, a color depth, a color gamut, and the like. The enhanced video capability may include a high dynamic range (HDR) image, a China Ultra High-Definition Video Industry Alliance (CUVA) HDR, and the like. The audio capability may include a sampling rate, a sampling depth, and a coding format.

In a possible implementation, for the auxiliary function (5), before S504, the first transmission apparatus may send a networking broadcast message to the second transmission apparatus through the downlink sideband. The first transmission apparatus receives a networking feedback message from the second transmission apparatus through the uplink sideband, where the feedback message indicates that the second transmission apparatus can establish a network topology structure with the first transmission apparatus. The first transmission apparatus establishes, based on the networking feedback message, the network topology structure with the second transmission apparatus.

Correspondingly, the second transmission apparatus is configured to receive the networking broadcast message from the first transmission apparatus through the downlink sideband. The second transmission apparatus sends, based on the networking broadcast message, the networking feedback message to the first transmission apparatus through the uplink sideband.

In a possible implementation, for the auxiliary function (6), the first transmission apparatus may receive status information from the second transmission apparatus through the uplink sideband, where the status information indicates at least one of a standby state, a power state, or a working state of the second transmission apparatus.

Correspondingly, the second transmission apparatus sends the status information to the first transmission apparatus through the uplink sideband.

In a possible implementation, for the auxiliary function (7), before S504, the first transmission apparatus may perform identity authentication on the second transmission apparatus through the sideband pair. After the identity authentication on the second transmission apparatus succeeds, S504 is performed.

Optionally, the downlink data stream may be an encrypted downlink data stream. The first transmission apparatus may further send key information to the second transmission apparatus through the downlink sideband, where the key information indicates a key and/or an encryption mode for the encrypted downlink data stream.

Correspondingly, the second transmission apparatus may receive the key information from the first transmission apparatus through the downlink sideband. The second transmission apparatus may decrypt the encrypted downlink data stream based on the key information.

In a possible implementation, for the auxiliary function (8), the first transmission apparatus may send control information to the second transmission apparatus through the downlink sideband, where the control information is used to control the second transmission apparatus to perform a first operation, and the first operation includes a playing operation, a standby operation, a source switching operation, or a volume control operation.

Correspondingly, the second transmission apparatus may receive the control information from the first transmission apparatus through the downlink sideband, and the second transmission apparatus performs the first operation in response to the control information.

Figure 10A:
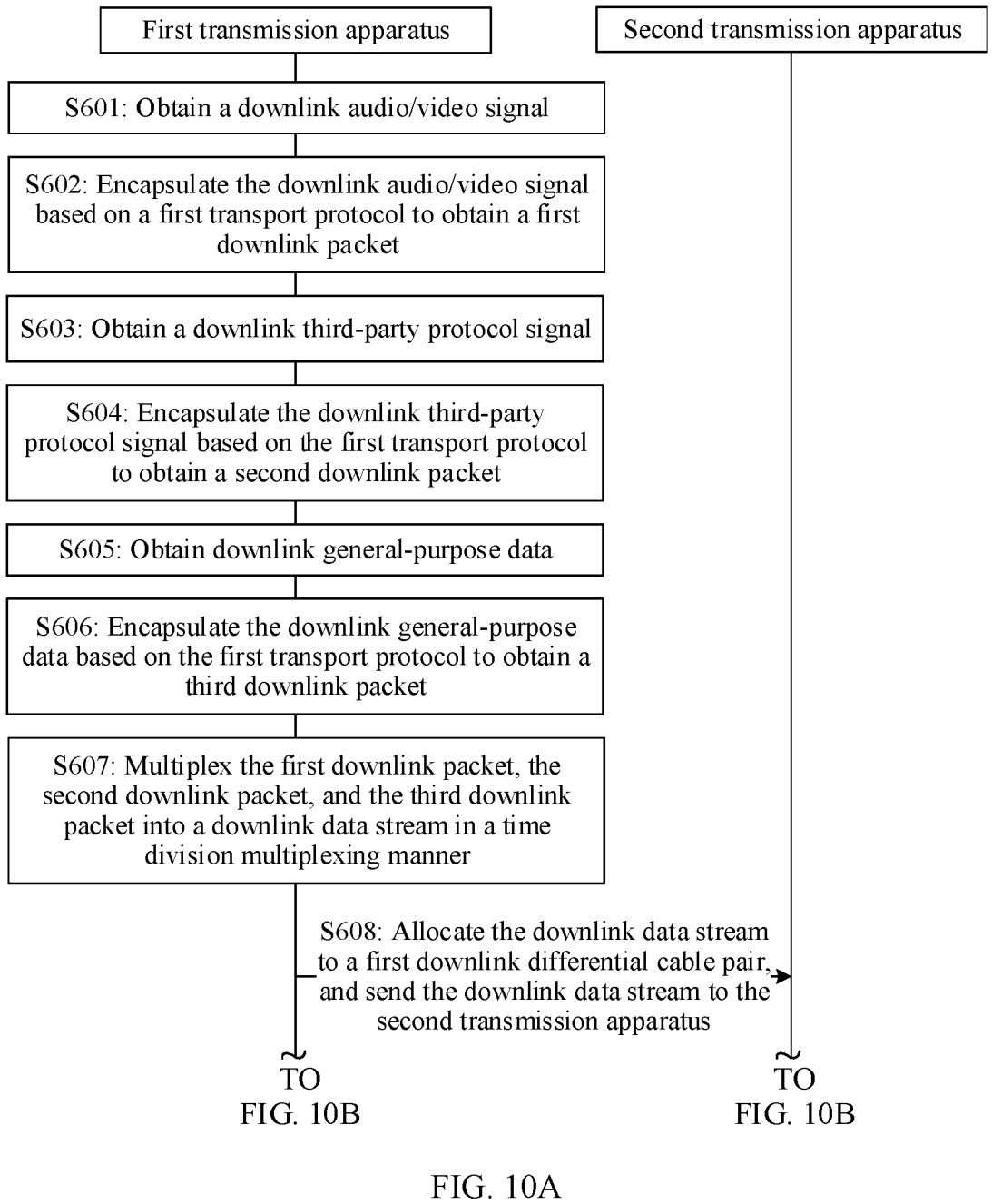
FIG. 10A and FIG. 10B are a schematic flowchart of a transmission method 600 according to an embodiment of the present disclosure.
Figure 10B:
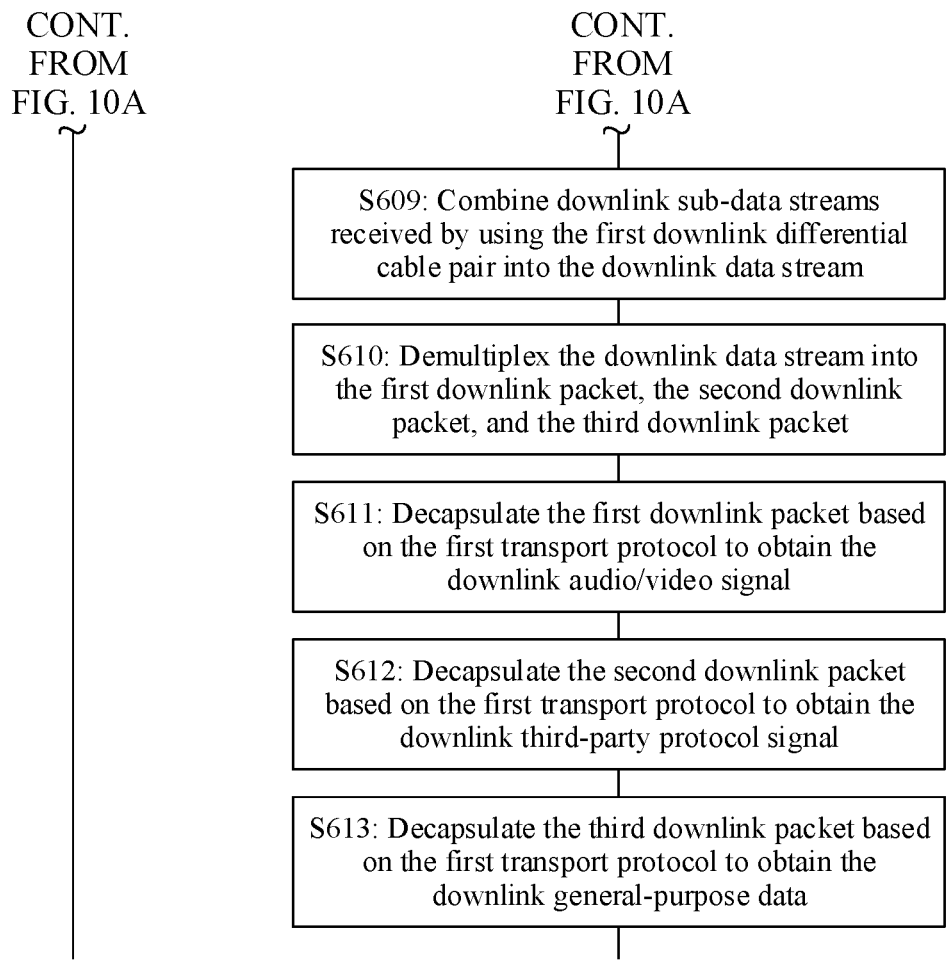

FIG. 10A and FIG. 10B are a schematic flowchart of a transmission method 600 according to an embodiment of the present disclosure. The method 600 may be applied to the foregoing system 100.

S601: A first transmission apparatus obtains a downlink audio/video signal. The downlink audio/video signal includes a downlink video signal and/or a downlink audio signal.

It should be noted that the first transmission apparatus may be the transmission apparatus 111 in the system 100.

In a possible implementation, the first transmission apparatus may receive the downlink audio/video signal from an audio/video signal source.

S602: The first transmission apparatus encapsulates the downlink audio/video signal based on a first transport protocol to obtain a first downlink packet.

S603: The first transmission apparatus obtains a downlink third-party protocol signal.

In a possible implementation, the first transmission apparatus may receive the downlink audio/video signal from a third-party protocol controller.

S604: The first transmission apparatus encapsulates the downlink third-party protocol signal based on the first transport protocol to obtain a second downlink packet.

S605: The first transmission apparatus obtains downlink general-purpose data.

In a possible implementation, the first transmission apparatus may receive the downlink audio/video signal from a first general-purpose data transceiver apparatus.

S606: The first transmission apparatus encapsulates the downlink general-purpose data based on the first transport protocol to obtain a third downlink packet.

S607: The first transmission apparatus multiplexes the first downlink packet, the second downlink packet, and the third downlink packet into a downlink data stream.

S608: The first transmission apparatus allocates the downlink data stream to a first main downlink lane, and sends the downlink data stream to a second transmission apparatus. The first transmission apparatus is connected to the second transmission apparatus through a first cable. The first cable includes a first number of main downlink lanes. The first main downlink lane includes at least one main downlink lane in the first number of main downlink lanes. Correspondingly, the second transmission apparatus receives a downlink sub-data stream from the first transmission apparatus through the first main downlink lane.

It should be noted that the second transmission apparatus may be the transmission apparatus 121 in the system 100.

S609: The second transmission apparatus combines downlink sub-data streams received through the first main downlink lane into the downlink data stream.

S610: The second transmission apparatus demultiplexes the first downlink packet, the second downlink packet, and the third downlink packet from the downlink data stream.

S611: The second transmission apparatus decapsulates the first downlink packet based on the first transport protocol to obtain the downlink audio/video signal.

S612: The second transmission apparatus decapsulates the second downlink packet based on the first transport protocol to obtain the downlink third-party protocol signal.

S613: The second transmission apparatus decapsulates the third downlink packet based on the first transport protocol to obtain the downlink general-purpose data.

It should be noted that S601 and S602 are processes of encapsulating the downlink audio/video signal, S603 and S604 are processes of encapsulating the downlink third-party protocol signal, and S605 and S606 are processes of encapsulating the downlink general-purpose data. The foregoing three encapsulation processes are independent of each other, and not subject to a specific sequence. Similarly, S611 is a process of decapsulating the first downlink packet, S612 is a process of decapsulating the second downlink packet, and S613 is a process of decapsulating the third downlink packet. The foregoing three decapsulation processes are independent of each other, and not subject to a specific sequence.

It should be further noted that S601 to S613 shown in FIG. 10A and FIG. 10B are a downlink transmission process. An uplink transmission process is similar to the downlink transmission process. For details, refer to the downlink transmission process. To avoid repetition, details are not described herein again.

It should be further noted that the first transmission apparatus and the second transmission apparatus may further implement various auxiliary functions through a sideband pair. For details, refer to the description in the method 500.

Figure 11A:
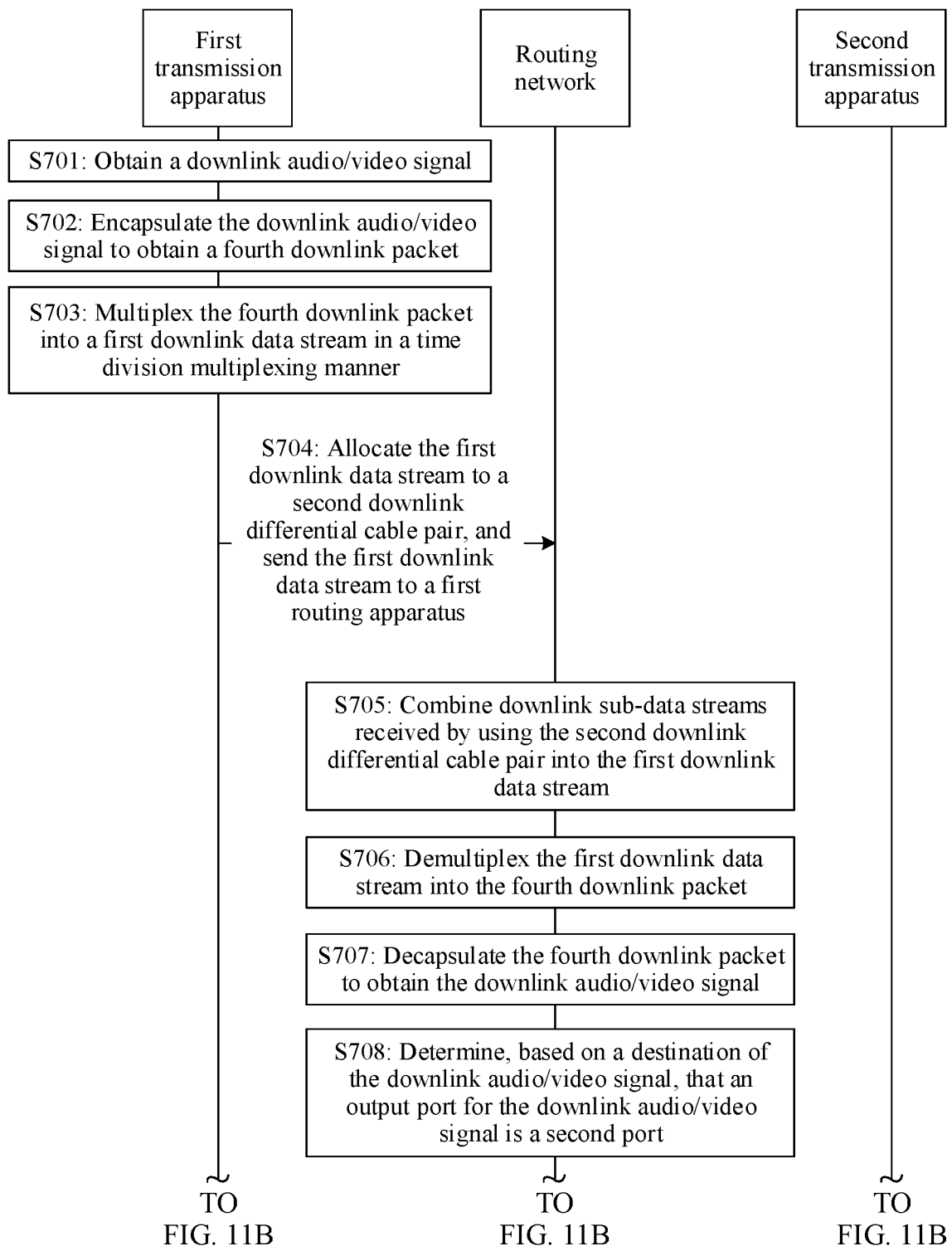
FIG. 11A and FIG. 11B are a schematic flowchart of a transmission method 700 according to an embodiment of the present disclosure.
Figure 11B:
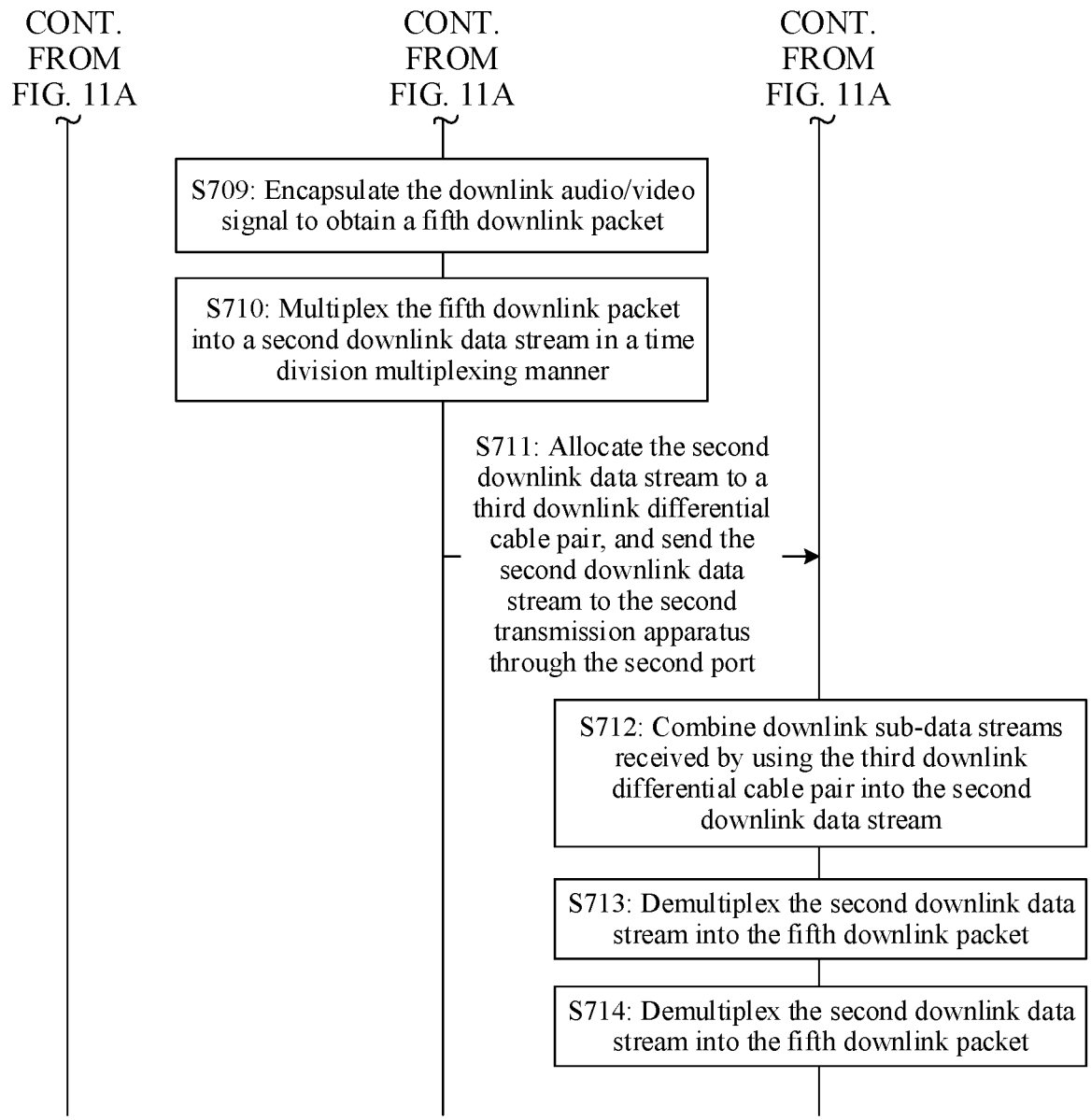

FIG. 11A and FIG. 11B are a schematic flowchart of a transmission method 700 according to an embodiment of the present disclosure. The method 700 may be applied to the system 300.

The following provides descriptions by using an example in which the method 700 is applied to the system 300 shown in FIG. 6. When the method 700 is applied to the system 300 shown in FIG. 7, refer to the following description.

S701: A first transmission apparatus obtains a downlink audio/video signal. The downlink audio/video signal includes a downlink video signal and/or a downlink audio signal.

It should be noted that the first transmission apparatus may be the transmission apparatus 311 in the system 300.

In a possible implementation, the first transmission apparatus may receive the downlink audio/video signal from an audio/video signal source.

S702: The first transmission apparatus encapsulates the downlink audio/video signal to obtain a fourth downlink packet.

S703: The first transmission apparatus pads the fourth downlink packet into a first downlink data stream.

S704: The first transmission apparatus allocates the first downlink data stream to a first sub-downlink lane, and sends the first downlink data stream to a routing network. The first transmission apparatus is connected to the routing network through a first sub-cable. The routing network is used to route and forward a data stream between the first transmission apparatus and a second transmission apparatus. The first sub-cable includes a third number of sub-downlink lanes and a fourth number of sub-uplink lanes. The first sub-downlink lane includes at least one sub-downlink lane in the third number of sub-downlink lanes. Correspondingly, the routing network receives a first downlink sub-data stream from the first transmission apparatus through the first sub-downlink lane in a first port (namely, the port 411).

It should be noted that the second transmission apparatus may be the transmission apparatus 321 in the system 300.

It should be noted that, for a relationship between the third number and the fourth number and a relationship between a fifth number and a sixth number, refer to the relationship between the first number and the second number described in FIG. 1 and FIG. 2.

Optionally, the third number may be the same as or different from the fifth number, and the fourth number may be the same as or different from the sixth number.

S705: The routing network combines downlink sub-data streams received through the first sub-downlink lane into the first downlink data stream.

S706: The routing network extracts the fourth downlink packet from the first downlink data stream.

S707: The routing network decapsulates the fourth downlink packet to obtain the downlink audio/video signal.

S708: The routing network determines, based on a destination of the downlink audio/video signal, that an output port for the downlink audio/video signal is a second port (namely, the port 417).

S709: The routing network encapsulates the downlink audio/video signal to obtain a fifth downlink packet.

S710: The routing network multiplexes the fifth downlink packet into a second downlink data stream.

S711: The routing network allocates the second downlink data stream to a second sub-downlink lane, and sends the second downlink data stream to the second transmission apparatus through the second port. The second transmission apparatus is connected to the routing network through a second sub-cable. The second sub-cable includes the fifth number of sub-downlink lanes and the sixth number of sub-uplink lanes. The second sub-downlink lane includes at least one sub-downlink lane in the fifth number of sub-downlink lanes. Correspondingly, the second transmission apparatus receives the downlink sub-data stream from the routing network through the second sub-downlink lane.

S712: The second transmission apparatus combines the downlink sub-data streams received through the second sub-downlink lane into the second downlink data stream.

S713: The second transmission apparatus demultiplexes the second downlink data stream into the fifth downlink packet.

S714: The second transmission apparatus demultiplexes the second downlink data stream into the fifth downlink packet.

It should be noted that S701 to S714 shown in FIG. 11A and FIG. 11B are a downlink transmission process. An uplink transmission process is similar to the downlink transmission process. For details, refer to the downlink transmission process. To avoid repetition, details are not described herein again.

It should be noted that, for a process of bidirectional transmission of an audio/video signal, a third-party protocol signal, and/or general-purpose data between the first transmission apparatus and the second transmission apparatus by using the routing network, refer to the method 600 and the method 700. To avoid repetition, details are not described herein again.

It should be further noted that the routing network may include at least one level of routing device. This is not limited in this embodiment of the present disclosure. Further, a cascading manner of the at least one level of routing device is not limited in this embodiment of the present disclosure.

It should be further noted that, when the routing network includes a plurality of levels of routing devices, for a transmission process of each routing device, refer to the method 700.

The foregoing describes the transmission method provided in embodiments of the present disclosure with reference to FIG. 9A to FIG. 11B. The following further describes a protocol stack that the transmission system provided in embodiments of the present disclosure complies with.

The protocol stack may include the following four layers.

1. Application layer: includes applications related to various data streams.

For example, in FIG. 5A, an application layer of the source device 110 may include the audio/video signal source 112, the audio/video signal processing apparatus 113, the management and control module 114, the third-party protocol controller 116, and the general-purpose data transceiver apparatus 117.

For another example, in FIG. 5B, an application layer of the sink device 120 may include the audio/video signal output apparatus 122, the audio/video signal collection apparatus 123, the management and control module 124, the third-party protocol apparatus 126, and the general-purpose data transceiver apparatus 127.

2. Adaption layer: describes management and control of the inside of the transmission system and interconnection specifications between internal and external components of the transmission system.

For example, in FIG. 5A, an adaption layer of the source device 110 may include the audio/video source adapter 131, the audio/video sink adapter 136, the management and control adapter 1310, the third-party protocol adapter 137, and the general-purpose data adapter 138.

For another example, in FIG. 5B, an adaption layer of the sink device 120 may include the audio/video source adapter 144, the audio/video sink adapter 143, the management and control adapter 1410, the third-party protocol adapter 147, and the general-purpose data adapter 148.

3. Transport layer: is used to describe a transport layer protocol specification of a system, including a data type, definition and arrangement of a structure, route control, bandwidth management, and the like.

For example, in FIG. 5A, a transport layer of the source device 110 may include the multiplexer 132, the lane allocator 133, the lane deallocator 134, the demultiplexer 135, and the arbiter 1311.

For another example, in FIG. 5B, a transport layer of the sink device 120 may include the lane allocator 141, the multiplexer 142, the demultiplexer 145, the lane deallocator 146, and the arbiter 1411.

4. Physical layer: is used to describe a physical layer specification of a system.

The physical layer includes: (1) a logic sublayer, (2) an electrical sublayer, and (3) a connector.

(1) Logic sublayer: is used to describe specifications related to the logic sublayer, including 128b/132b encoding and decoding, scrambling and descrambling, FEC encoding and decoding, and link training.

(2) Electrical sublayer: is used to describe specifications related to the electrical sublayer, including an electrical feature of a signal.

(3) Connector

For example, in FIG. 5A, a physical layer of the source device 110 includes the port 139 and the connector 115.

For another example, in FIG. 5B, a physical layer of the sink device 120 includes the port 149 and the connector 125.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus comprising:
 a processor;
 a first port configured to connect to a second transmission apparatus through a first cable, wherein the first cable comprises a first number of main downlink lanes and a second number of main uplink lanes;
 a first audio/video source adapter configured to:
  obtain a downlink media signal, wherein the downlink media signal comprises at least one of a downlink video signal or a downlink audio signal;
  encapsulate the downlink media signal to obtain a first downlink packet; and
  send the first downlink packet;
 a first multiplexer configured to:
  receive the first downlink packet from the first audio/video source adapter;
  pad the first downlink packet into a downlink data stream to obtain a padded downlink data stream; and
  send the padded downlink data stream;
 a first lane allocator configured to:
  receive the downlink data stream from the first multiplexer;
  allocate the downlink data stream to a first main downlink lane of the main downlink lanes; and
  send the downlink data stream to the second transmission apparatus;
 a first lane deallocator configured to:
  receive an uplink sub-data stream from the second transmission apparatus through a first uplink lane of the main uplink lanes;
  combine the uplink sub-data stream into an uplink data stream; and
  send the uplink data stream;
 a first demultiplexer configured to:
  receive the uplink data stream from the first lane deallocator;
  extract a first uplink packet from the uplink data stream; and
  send the first uplink packet; and
 a first audio/video sink adapter configured to:
  receive the first uplink packet from the first demultiplexer; and
  decapsulate the first uplink packet to obtain an uplink media signal.

2. The apparatus of claim 1, further comprising a first third-party protocol adapter configured to:
 obtain a downlink third-party protocol signal;
 encapsulate the downlink third-party protocol signal to obtain a second downlink packet; and
 send the second downlink packet to the first multiplexer;
 wherein the first multiplexer is further configured to multiplex the first downlink packet and the second downlink packet into the downlink data stream,
 wherein the first demultiplexer is further configured to:
  demultiplex the first uplink packet and a second uplink packet from the uplink data stream; and
  send the second uplink packet to the first third-party protocol adapter, and
 wherein the first third-party protocol adapter is further configured to decapsulate the second uplink packet to obtain an uplink third-party protocol signal.

3. The apparatus of claim 1, further comprising a first general-purpose data adapter configured to:
 obtain downlink general-purpose data;
 encapsulate the downlink general-purpose data to obtain a third downlink packet; and
 send the third downlink packet to the first multiplexer;
 wherein the first multiplexer is further configured to multiplex the first downlink packet and the third downlink packet into the downlink data stream,
 wherein the first demultiplexer is further configured to demultiplex the first uplink packet and a third uplink packet from the uplink data stream,
 wherein the first demultiplexer is further configured to send the third uplink packet to the first general-purpose data adapter, and
 wherein the first general-purpose data adapter is further configured to decapsulate the third uplink packet to obtain uplink general-purpose data.

4. The apparatus of claim 1, wherein the first audio/video source adapter is further configured to further encapsulate the downlink media signal based on a first transport protocol, and wherein the first audio/video sink adapter is further configured to further decapsulate the first uplink packet based on the first transport protocol.

5. The apparatus of claim 1, further comprising a first management and control adapter configured to implement, through a sideband link lane of the first cable, at least one of plug detection, flip identification, high-speed transmission link training information exchange, device capability information obtaining, device status information obtaining, discovery and establishment of a network topology structure, content protection information exchange, or device interoperation.

6. The apparatus of claim 1, wherein the apparatus is configured to connect to a routing network through the first cable for routing and forwarding the uplink data stream and the downlink data stream that are between the apparatus and the second transmission apparatus, wherein the first lane allocator is further configured to send the downlink data stream to the routing network, and wherein the first lane deallocator is further configured to receive the uplink sub-data stream from the routing network.

7. The apparatus of claim 6, wherein the routing network comprises at least one level of routing device.

8. The apparatus of claim 1, wherein the first number of main downlink lanes is greater than or equal to the second number of main uplink lanes.

9. An apparatus comprising:
 a processor;
 a first port configured to connect to a first transmission apparatus through a first cable, wherein the first cable comprises a first number of main downlink lanes and a second number of main uplink lanes;
 a first audio/video source adapter configured to:
  obtain an uplink media signal, wherein the uplink media signal comprises at least one of an uplink video signal or an uplink audio signal;

encapsulate the uplink media signal to obtain a first uplink packet; and
send the first uplink packet;
a first multiplexer configured to:
receive the first uplink packet from the first audio/video source adapter;
pad the first uplink packet into an uplink data stream to obtain a padded uplink data stream; and
send the padded uplink data stream;
a first lane allocator configured to:
receive the uplink data stream from the first multiplexer;
allocate the uplink data stream to a first main uplink lane of the main uplink lanes; and
send the uplink data stream to the first transmission apparatus;
a first lane deallocator configured to:
receive a downlink sub-data stream from the first transmission apparatus through a first main downlink lane of the main downlink lanes;
combine the downlink sub-data stream into a downlink data stream; and
send the downlink data stream;
a first demultiplexer configured to:
receive the downlink data stream from the first lane deallocator;
extract a first downlink packet from the downlink data stream; and
send the first downlink packet; and
a first audio/video sink adapter configured to:
receive the first downlink packet; and
decapsulate the first downlink packet to obtain a downlink media signal.

10. The apparatus of claim 9, further comprising a first third-party protocol adapter configured to:
obtain an uplink third-party protocol signal;
encapsulate the uplink third-party protocol signal to obtain a second uplink packet; and
send the second uplink packet to the first multiplexer;
wherein the first multiplexer is further configured to multiplex the first uplink packet and the second uplink packet into the uplink data stream,
wherein the first demultiplexer is further configured to demultiplex the first downlink packet and a second downlink packet from the downlink data stream,
wherein the first demultiplexer is further configured to send the second downlink packet to the first third-party protocol adapter, and
wherein the first third-party protocol adapter is further configured to decapsulate the second downlink packet to obtain a downlink third-party protocol signal.

11. The apparatus of claim 9, further comprising a first general-purpose data adapter configured to:
obtain uplink general-purpose data;
encapsulate the uplink general-purpose data to obtain a third uplink packet; and
send the third uplink packet to the first multiplexer;
wherein the first multiplexer is further configured to multiplex the first uplink packet and the third uplink packet into the uplink data stream,
wherein the first demultiplexer is further configured to demultiplex a third downlink packet from the downlink data stream,
wherein the first demultiplexer is further configured to send the third downlink packet to the first general-purpose data adapter, and
wherein the first general-purpose data adapter is further configured to decapsulate the third downlink packet to obtain downlink general-purpose data.

12. The apparatus of claim 9, wherein the first audio/video source adapter is further configured to further encapsulate the downlink media signal based on a first transport protocol, and wherein the first audio/video sink adapter is further configured to further decapsulate the first uplink packet based on the first transport protocol.

13. The apparatus of claim 9, further comprising a first management and control adapter configured to implement, through a sideband link lane of the first cable, at least one plug detection, flip identification, high-speed transmission link training information exchange, device capability information obtaining, device status information obtaining, discovery and establishment of a network topology structure, content protection information exchange, or device interoperation.

14. The apparatus of claim 9, wherein the apparatus is configured to connect to a routing network through the first cable for routing and forwarding the uplink data stream and the downlink data stream that are between the apparatus and the first transmission apparatus, wherein the first lane allocator is configured to send the uplink data stream to the routing network, and wherein the first lane deallocator is configured to receive the downlink sub-data stream from the routing network.

15. The apparatus of claim 14, wherein the routing network comprises at least one level of routing device.

16. An apparatus comprising:
a processor;
a first port configured to connect to a second transmission apparatus through a first cable, wherein the first cable comprises a first number of main downlink lanes and a second number of main uplink lanes;
a first audio/video source adapter configured to:
obtain a downlink media signal, wherein the downlink media signal comprises at least one of a downlink video signal or a downlink audio signal;
encapsulate the downlink media signal to obtain a first downlink packet; and
send the first downlink packet;
a first multiplexer configured to:
receive the first downlink packet from the first audio/video source adapter;
pad the first downlink packet into a downlink data stream to obtain a padded downlink data stream; and
send the padded downlink data stream;
a first lane allocator configured to:
receive the downlink data stream from the first multiplexer;
allocate the downlink data stream to a first main downlink lane of the main downlink lanes; and
send the downlink data stream to the second transmission apparatus.

17. The apparatus of claim 16, further comprising a first lane deallocator configured to:
receive an uplink sub-data stream from the second transmission apparatus through a first uplink lane of the main uplink lanes;
combine the uplink sub-data stream into an uplink data stream; and
send the uplink data stream.

18. The apparatus of claim 17, further comprising a first demultiplexer configured to:
receive the uplink data stream from the first lane deallocator;

extract a first uplink packet from the uplink data stream; and send the first uplink packet.

19. The apparatus of claim 18, further comprising a first audio/video sink adapter configured to:
  receive the first uplink packet from the first demultiplexer; and
  decapsulate the first uplink packet to obtain an uplink media signal.

20. The apparatus of claim 19, further comprising a first third-party protocol adapter configured to:
  obtain a downlink third-party protocol signal;
  encapsulate the downlink third-party protocol signal to obtain a second downlink packet; and
  send the second downlink packet to the first multiplexer;
  wherein the first multiplexer is further configured to multiplex the first downlink packet and the second downlink packet into the downlink data stream,
  wherein the first demultiplexer is further configured to:
    demultiplex the first uplink packet and a second uplink packet from the uplink data stream; and
    send the second uplink packet to the first third-party protocol adapter, and wherein the first third-party protocol adapter is further configured to decapsulate the second uplink packet to obtain an uplink third-party protocol signal.

* * * * *